United States Patent

[11] 3,611,408

[72] Inventors David J. Shoemaker
Columbus;
Rex W. Dewey, Columbus; James L. Griffith, Worthington; Paul H. Troutman, Columbus; Franklin A. Wolf, Columbus, all of Ohio
[21] Appl. No. 817,248
[22] Filed Apr. 7, 1969
[45] Patented Oct. 5, 1971
[73] Assignee Industrial Nucleonics Corporation
Continuation of application Ser. No. 634,594, Apr. 28, 1967, now abandoned.

[54] DIGITAL SETUP APPARATUS FOR RADIATION GAUGING AND CONTROLLING SYSTEMS
20 Claims, 14 Drawing Figs.
[52] U.S. Cl. .................................................. 346/17,
346/49, 250/83.3, 318/569
[51] Int. Cl. .................................................. G01d 7/00
[50] Field of Search .......................................... 346/17, 49,
62; 250/83.3 D, 83.3 R; 235/151.1, 151.3, 151.35;
318/569, 600

[56] References Cited
UNITED STATES PATENTS
| 2,829,268 | 4/1958 | Chope | 250/83.3 |
|---|---|---|---|
| 3,363,257 | 1/1968 | Dewey et al. | 346/17 |
| 2,669,662 | 2/1954 | Lundahl et al. | 250/52 |
| 2,936,374 | 5/1960 | Zimmer | 250/83.3 |

OTHER REFERENCES
Aronsen, Arthur N.; Quality Control With Beta Gauges On A Multistation Coater; Tappi, Vol. 49, No. 11, November 1966, pp. 114A–116A.

Primary Examiner—Joseph W. Hartary
Attorneys—William T. Fryer, III, C. Henry Peterson and James J. O'Reilly ABSTRACT: Disclosed herein is a radiation gauge equipped with a strip chart recorder for measuring the properties of moving materials. The recorder has a multiplicity of scales with selectively illuminated scale numerals, a measuring pen and pointer, and a specification target marking pen and pointer. The gauge includes a digital setup arrangement which receives decimal input numbers, indicative of the specification target value for the material to be measured and its composition, either from decimally numbered dials on the operator's control panel, or from some other input device. Digital logic circuits responsive to the input numbers automatically select the proper scale to be used and illuminate the proper scale numbers. The logic circuits use both the specification target numbers and the composition numbers to automatically and digitally select the center scale and span settings which properly calibrate the gauge for the material to be measured. The logic circuits further use these input numbers to control a digital to analog converter servomechanism which drives the specification target pen and pointer. The operation of this converter is automatically sequenced to mark successively on the moving recorder chart lines whose positions identify the scale used, the material composition measured and the specification target value. The final position of the target pen and pointer determines the set point for an automatic controller for the process machine which produces the measured material.

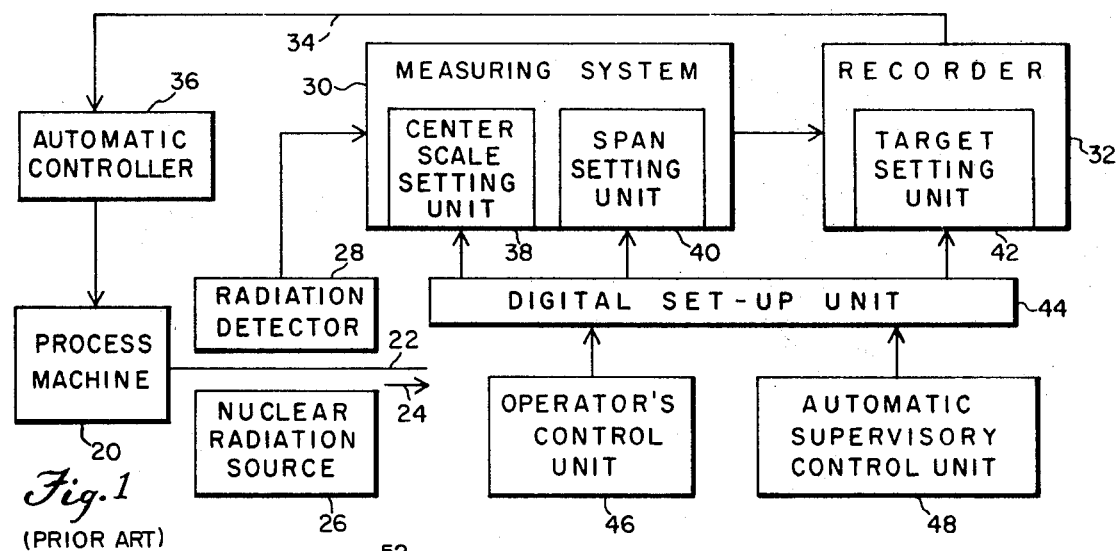
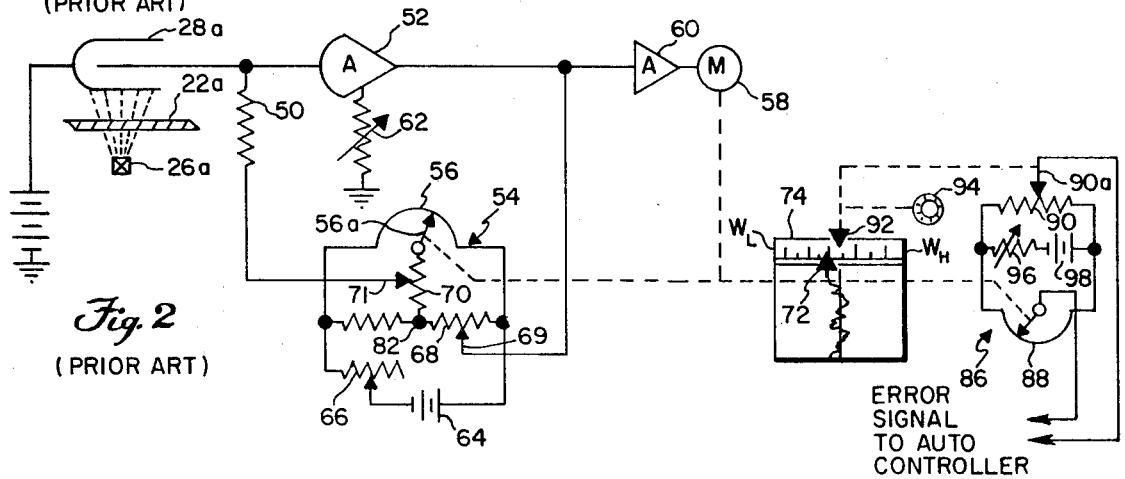
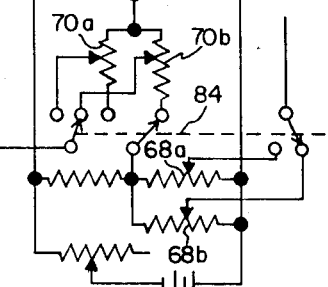
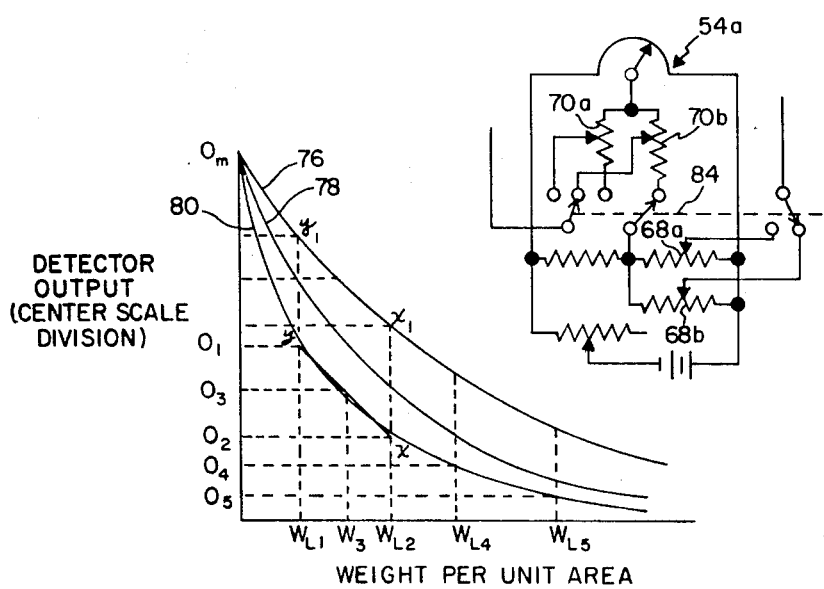

INVENTORS
David J. Shoemaker
Rex W. Dewey
James L. Griffith
Paul H. Troutman
Franklin A. Wolf INVENTORS
David J. Shoemaker
Rex W. Dewey
James L. Griffith
Paul H. Troutman
Franklin A. Wolf

BY

G. Henry Pitman
Agent

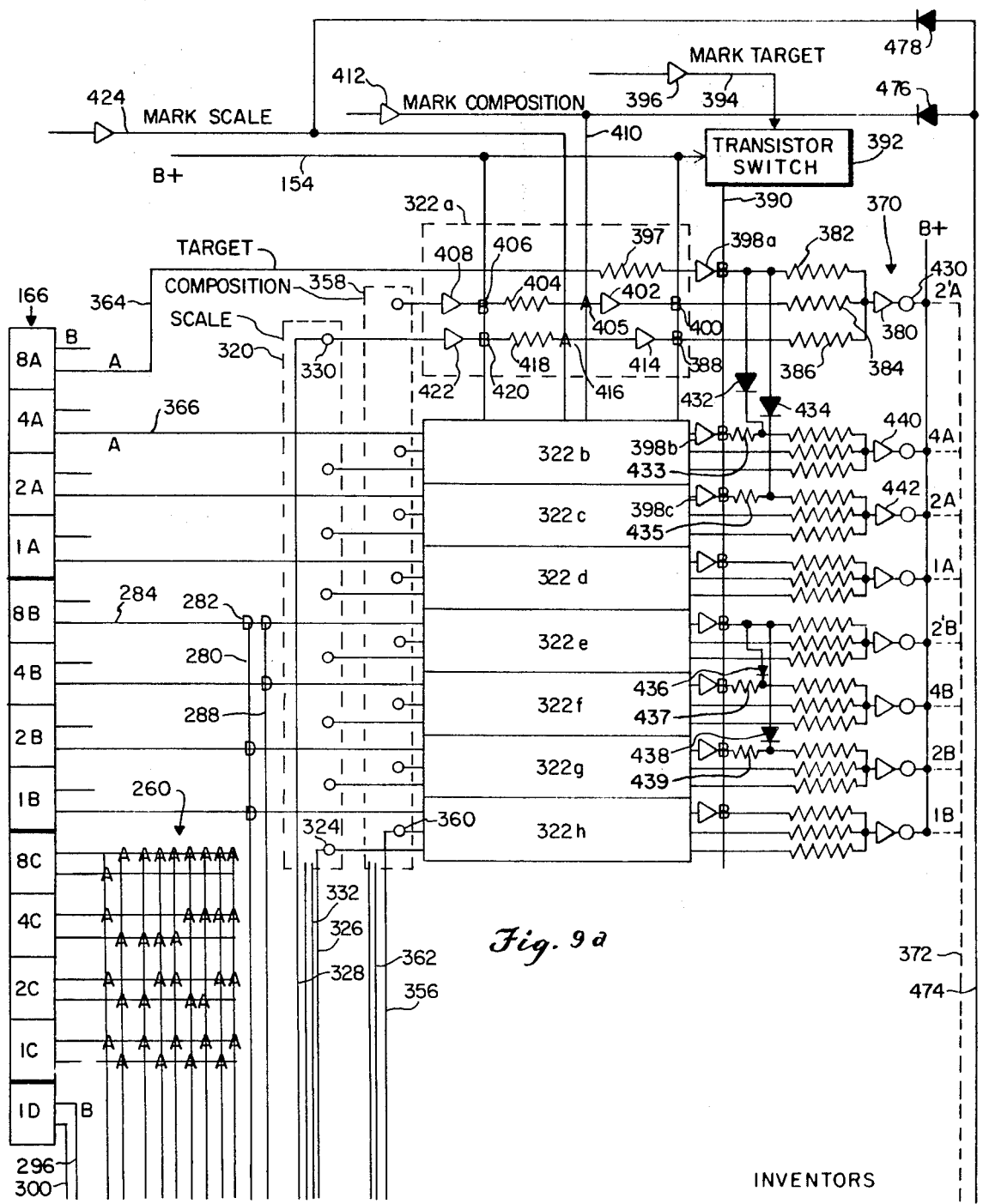

INVENTORS
David J. Shoemaker
Rex W. Dewey
James L. Griffith
Paul H. Troutman
Franklin A. Wolf

BY

G. Henry Peterson

Agent

INVENTORS
David J. Shoemaker
Rex W. Dewey
James L. Griffith
Paul H. Troutman
Franklin A. Wolf BY
G. Henry Peterson
Agent

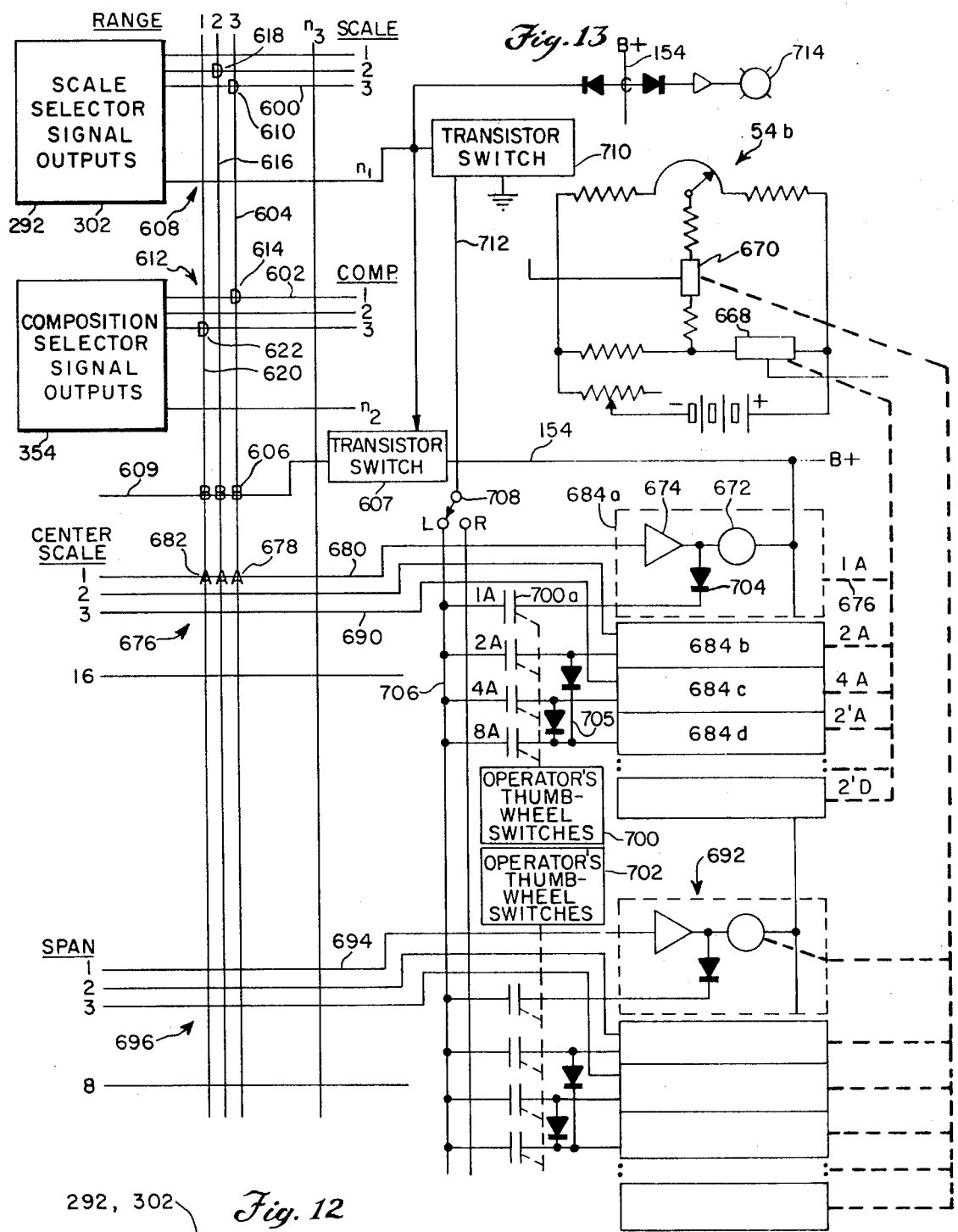

DIGITAL SETUP APPARATUS FOR RADIATION GAUGING AND CONTROLLING SYSTEMS

This is a streamlined continuation of Ser. No. 634,594 filed Apr. 28, 1967, now abandoned.

This invention relates to radiation gauging and process control systems, and more particularly it relates to digital setup apparatus therefor.

It is highly desirable that arrangements be made to set up these systems decimally in process units, for the operator's convenience, to minimize human error, and to enable the gauge to be set up automatically by a remote device such as a digital computer which exercises a supervisory function in the manufacturing plant.

Digital setup arrangements have been provided in the past by operating a turret mechanism to selectively insert standard samples in a reference radiation beam. Other arrangements have used tape or punch card reading devices to program servomechanism setup devices which use the voltage output of a digital-to-analog converter to operate servomotors so as to drive multiturn analog potentiometers to calibration setting. The first arrangement has the disadvantage of requiring a multitude of samples of materials of the exact specification values. It is not practical where dimensionally unstable or volatile materials such as moist paper are to be measured. The second arrangement has the disadvantage that a lengthy and complicated program must be worked out in advance and stored in the form of an individual punch card or tape program for each material specification to be used. Since hundreds of such programs are often needed, the problems of preparation, checking, filing, storage and access are considerable, particularly where a data processing machine with substantial memory capacity is not available. Both of the foregoing arrangements have the disadvantage that the measurements are presented on the recorder in the form of a deviation-from-specification indication only, and the operator viewing the chart and the scale cannot determine directly therefrom the actual value of his target or the value of the measurement when there is a deviation.

It is the general object of this invention to provide a radiation gauging and process control system which overcomes many disadvantages of prior systems, and which is capable of achieving a greatly improved presentation and recording of the setup data and the measured values. The many specific objects and advantages will become apparent from the following detailed description of one preferred embodiment of the invention taken in conjunction with the appended drawings, in which:

FIG. 1 is a block diagram of the general overall arrangement of a radiation gauging and controlling system utilizing digital setup apparatus.

FIG. 2 is a simplified schematic showing of the basic electrical and mechanical arrangement of a typical radiation gauging and controlling system.

FIG. 3 is a graph showing typical response curves for a radiation gauge and illustrating both the mechanics of its calibration and the effect of the measured material composition. The effect of composition is exaggerated for clarity.

FIG. 4 is a circuit diagram showing a modification of FIG. 2.

FIGS. 1, 2 and 4 illustrate known apparatus, and accordingly are labeled "prior art." However, they are deemed essential to a clear explanation of the present invention, which is somewhat complex in some of its details, and reference is made to these simple figures to clarify the explanation throughout the specification.

Figure 9B:
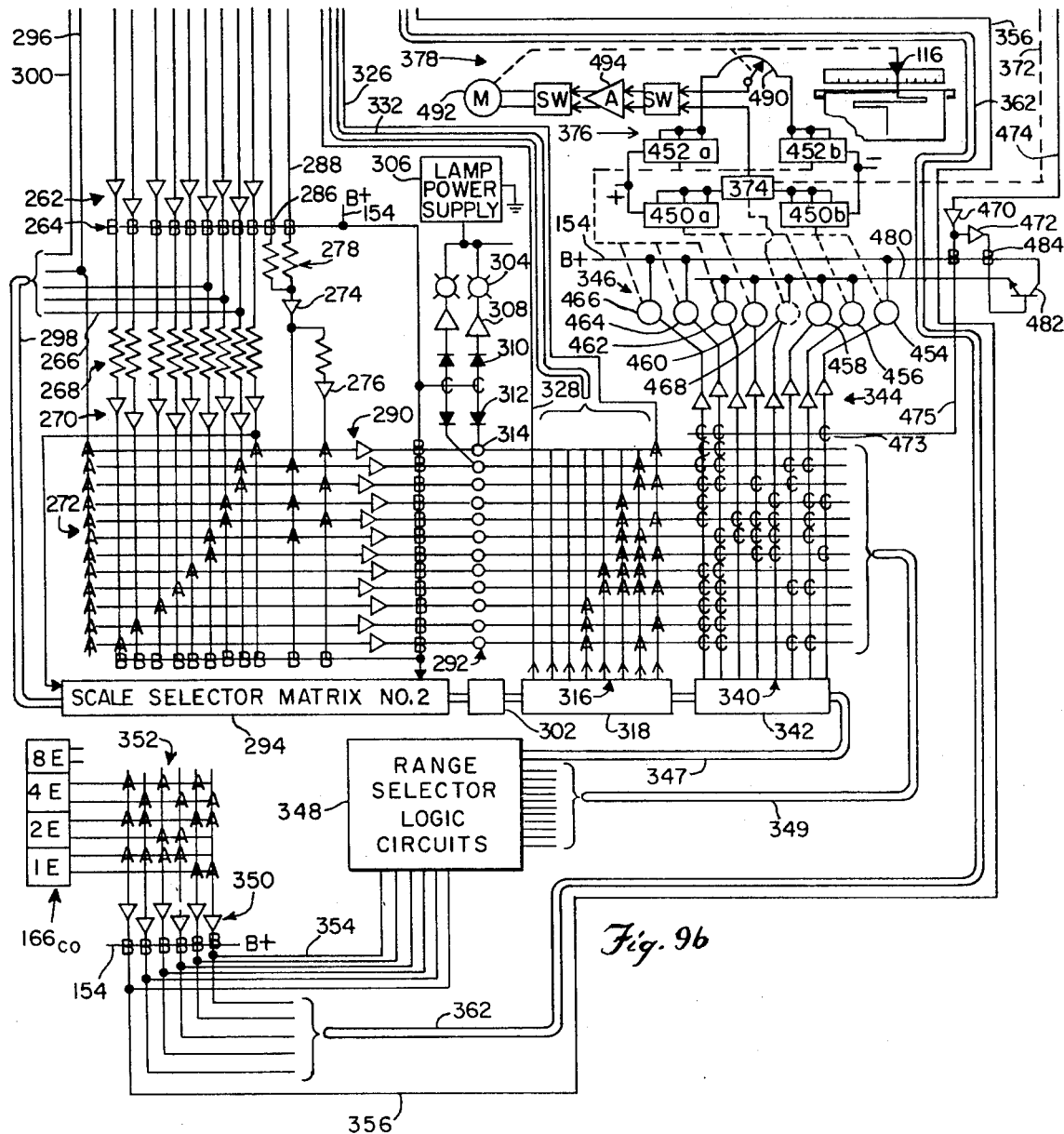

FIGS. 9a and 9b are on two separate sheets. When FIG. 9a is placed above FIG. 9b so that corresponding lines as at 300 and 356 at the lateral edges coincide, these sheets form a single circuit diagram herein referred to as FIG. 9. FIG. 9 shows the principal portion of the logic circuits of the setup unit and their relationship to the digital-to-analog converter.

Figure 10:
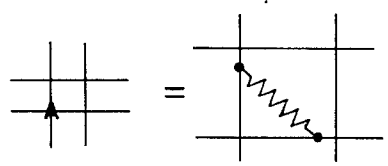

FIG. 10 shows another logic symbol and a portion of a resistor matrix represented thereby.

Figure 11:
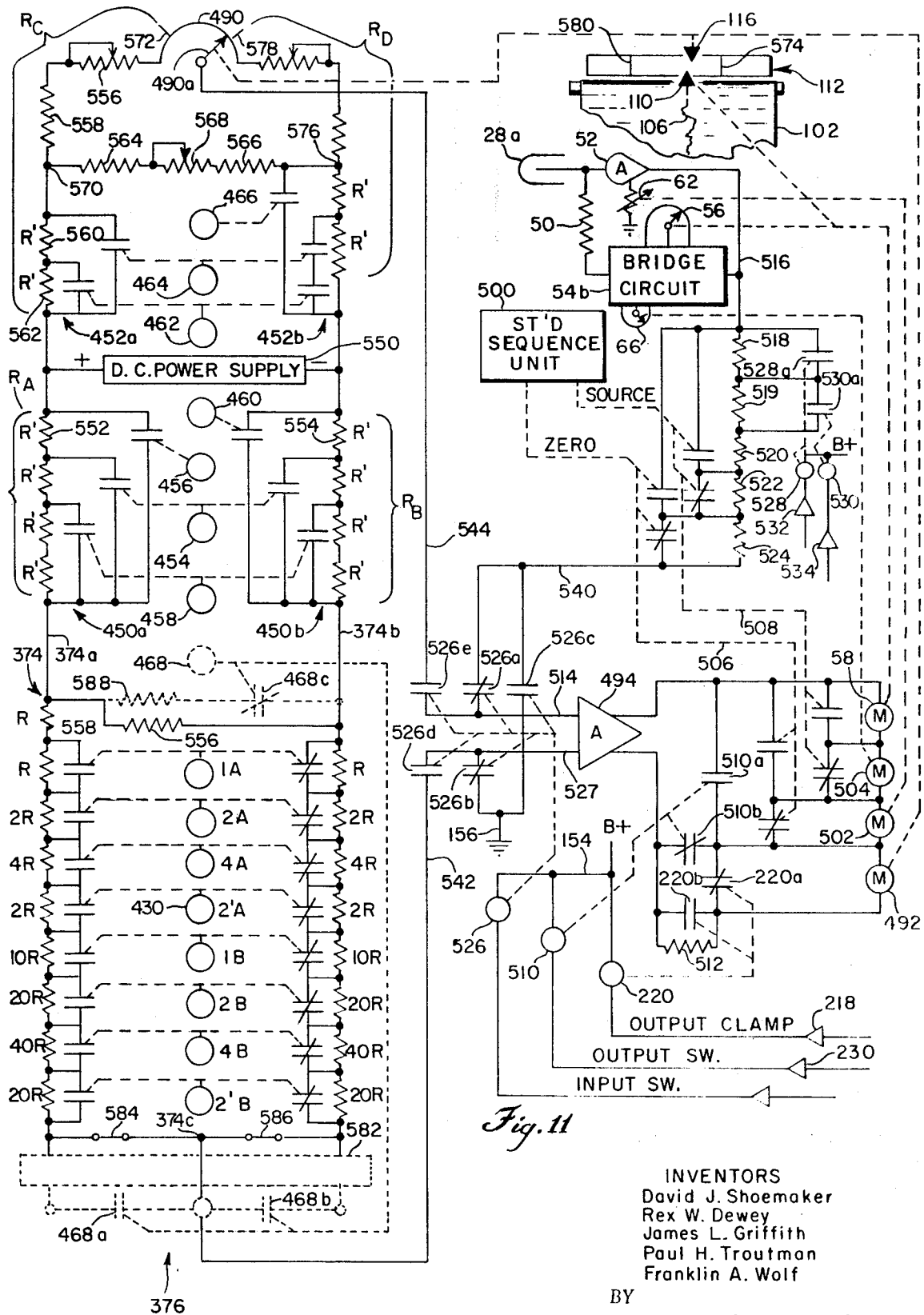

FIG. 11 is a partly schematic diagram of the digital-to-analog converter according to the invention including the servomechanism arrangement of the gauge and the converter with the servoamplifier time sharing arrangement and automatic gain changing circuits.

FIG. 12 is a circuit diagram of the gain-change matrix and gain-change relay drivers.

FIG. 13 is a partly schematic diagram showing a portion of the center scale and span selector logic circuits and the arrangement of the digital center scale and span setup units in the radiation gauge-measuring circuit according to one preferred embodiment of the invention.

Referring now to FIG. 1, there is shown generally a process machine 20 for operating on a material 22 traveling in the direction of the arrow 24. For purposes of example, process machine 20 may be considered to represent a reversing mill for reducing a metal alloy strip 22 to smaller and smaller thicknesses on successive passes through the mill. However, it is understood that the process machine represented by box 20 could represent a plastics or rubber calender, a papermaking machine, a plastics or metal extruding machine, a textile drafting apparatus, a cigarette making machine, or any one of a number of diverse process machines which forms or modifies a material in a continuous or quasi-continuous manner. Likewise, process machine 20 can as well represent a machine for handling fluid in a chemical or mixing process which delivers a flow of fluid through a pipe or conduit, and in this case the product 22 can represent the flow of the fluid through an output or transfer pipe or conduit.

For the purpose of measuring a characteristic of the material 22, a nuclear radiation source 26 and a radiation detector 28 may be mounted on opposite sides of the material, or other arrangements such as backscatter arrangements, where the source 26 and detector 28 are arranged on the same side of the material, may be used. In the example to be used herein of a reversing mill, the source and detector will be supported in a suitable gauging head structure (not shown) mounted between the reducing rolls of the mill and the reel at one side of the mill, with the gauging head structure being arranged to traverse back and forth across the width of the metal alloy strip, or to move the source and detector off-sheet to one side of the strip as required to facilitate threading the metal strip through the mill, to automatically standardize the radiation gauge, or for other purposes. Such arrangements are conventional and well known, and no detailed description herein is necessary.

The output of the radiation detector 28 is fed into the radiation gauge-measuring system, represented by box 30. The measuring system 30 translates the output of detector 28 into a measurement of the material property of interest, e.g., the thickness of the alloy strip 22 being delivered to the reel on one side of the reversing mill 20. The measuring system in this example translates the radiation detector output into a signal representing mils, that is, thousandths of an inch, which is presented on a recorder 32. A signal is also fed over line 34 to an automatic controller 36 which controls the process machine 20 in such a way as to maintain the measured property of material 22 constant at a desired value. In the example given herein of a reversing mill for metals rolling, the automatic controller 36 may be utilized to control the screwdown pressure between the rolls, or to adjust the tension of the strip between the mill rolls and the reel, or both forms of adjustment may be actuated under proper conditions in accordance with well-known arrangements.

The system of the present invention is particularly concerned with a digitally controlled arrangement for setting up the measuring system 30 of the nuclear radiation gauge as well as the target or set point for the automatic controller 36, so that the indications derived from recorder 32 will most accurately and meaningfully represent the absolute value of the measured property of material 22 in any desired units of measurement, and so that the signal fed over line 34 to the automatic controller will in a similar manner properly represent error-from-target information both as to direction and magnitude.

All nucleonic gauge-measuring systems capable of accurate and meaningful measurement include, in one form or another, a unit here referred to as a "center scale" setting unit 38 and what is referred to herein as a "span"-setting unit 40. The center scale setting unit is used to select the value of a suppression signal, or suppression voltage, which is compared in the measuring system with the output of the radiation detector 28, so that the measuring system will provide either a zero output signal or a predetermined reference indication on recorder 32 when the material property being measured has a predetermined value. The span-setting unit 40 permits selection of the magnitude of the output signal increment or the magnitude of the deflection on the recorder which is obtained when the value of the measured property deviates from the predetermined value by a selected amount.

Similarly, all suitably designed automatic control arrangements used with nucleonic gauges utilize in one form or another a target-setting unit 42, here shown as being incorporated in the recorder 32, which permits selection of the value of the measuring system output signal, or a particular value indicated on the recorder, which represents the desired value of the material property being measured.

The present invention relates to improvements in a digital setup unit 44 and its interconnections with the center scale-setting unit 38, the span-setting unit 40 and the target-setting unit 42. The digital setup unit 44 is the interconnecting link between an operator's control unit 46, the center scale-setting unit 38, the span-setting unit 40 and the target-setting unit 42.

The human operator of the machine may utilize the controls provided on the control unit 46 to select the nuclear gauge and automatic control target settings. These settings can also be selected by an automatic supervisory control unit 48. Control unit 48 may be provided in the form of a punch card or tape reading device, a communication link, a digital computer or other device which may be employed to present the proper operating information to the nuclear gauging and controlling system.

It is to be appreciated that the general nucleonic gauging and controlling system of FIG. 1, including generally a digital setup unit with operator and supervisory controls is not broadly new nor claimed herein, and accordingly FIG. 1 has been labeled "prior art."

In order to provide further background information necessary to an understanding and appreciation of the present invention, it is further appropriate to refer to the simplified schematic showing of a typical prior art nucleonic gauging and automatic control target-setting arrangement shown in FIG. 2. FIG. 2 illustrates in particular a nucleonic gauge circuit according to U.S. Pat. No. 2,790,945, issued Apr. 30, 1957 to H. R. Chope. Herein there is shown a nuclear radiation source 26a, a measured material 22a, and an ionization chamber detector 28a. The detector 28a is connected to a "high-meg" resistor 50 and to the input of a form of operational amplifier 52. The output of amplifier 52 is connected to the other end of the high-meg resistor 50 via a negative feedback loop which includes a measuring bridge circuit 54. Bridge 54 includes a slidewire 56 having a slidewire arm or wiper 56a which is driven by a servomotor 58. Servomotor 58 is energized from the output of a servoamplifier 60 in response to any output from amplifier 52. Amplifier 52 is adjusted by means of a rheostat 62 so that it has zero output for zero input. The bridge circuit 54 is energized by a voltage source represented by battery 64 through a source-standardizing potentiometer 66. Potentiometers 62 and 66 are automatically adjusted at occasional or periodic intervals to maintain permanent calibration of the apparatus.

In the particular nuclear gauge circuit of FIG. 2, potentiometer 68 is the elementary center scale-setting unit which corresponds to unit 38 of FIG. 1. Similarly, in the circuit of FIG. 2, a potentiometer 70 constitutes the elementary span-setting unit corresponding to unit 40 in FIG. 1. These setting units are used to calibrate the instrument so that its output accurately represents the actual value of the measured variable in any desired unit of measurement, within a suitably limited range of values. In the instrument shown in FIG. 2, the output is a mechanical position analog signal, specifically the instantaneous location of a pen and pointer assembly 72 which is positioned by the servomotor 58 which drives the measuring slidewire arm 56a. The position of the pen and pointer assembly 72 is taken with reference to the markings on an associated index scale 74, which markings indicate values of the material property being measured in measurement units chosen by the user of the instrument.

The functions of the center scale-setting unit and the span-setting unit can be further explained with reference to FIG. 3. FIG. 3 is a graph showing three "absorption curves" or more properly, transmittance curves 76, 78 and 80. Each of these curves is a plot of the radiation detector output as a function of the weight per unit area of a sheet material, as at 22a in FIG. 2, which is interposed between a radiation source as at 26a and a detector as at 28a. As is well known, the transmittance curves for materials of significantly different compositions have different shapes depending on the ratio $Z/A$, where $Z$ is the effective atomic number of the material and $A$ is its effective atomic weight. Materials having high values of $Z/A$ produce curves which sag more in the middle. The shape of the transmittance curves obtained also depends on the unique characteristic of each source and detector combination so that each instrument produces its own distinctive transmittance curve for any given material.

When the radiation gauge is used to measure the product of an industrial process, only a portion of the one appropriate transmittance curve is "in use" at any given time. To illustrate, assume that the material being measured at the time has a composition which produces transmittance curve 80, and that the particular weight per unit area of the material being produced lies somewhere between $W_{L1}$ and $W_{L2}$. It is then desirable to have the instrument scale 74 in FIG. 2 marked off with suitably numbered graduations extending from the low value $W_L$ at the left end of the scale to the high value $W_H$ at the right end of the scale.

For this purpose, the gauge is calibrated essentially so that when the detector output is $0_1$ (FIG. 3) the pen and pointer assembly 72 will be driven to the left end of the scale to indicate $W_L$. When the detector output is $0_2$, the pen and pointer assembly will be driven to the right end of the scale labeled $W_H$. When the detector output is somewhere between $0_1$ and $0_2$, the pen and pointer will be driven to an intermediate position which corresponds to the weight per unit area of the material being measured.

To achieve this calibration, the center scale-setting unit 38 of FIG. 1, exemplified by potentiometer 68 in FIG. 2, is set to produce a voltage, say, between the potentiometer tap 69 and the center point 82 in the bridge circuit which is equal in magnitude to a detector output $0_3$ which is essentially halfway between the output values $0_1$ and $0_2$. With this setting of potentiometer 68, the pen and pointer mechanism 72 will be driven to the center point of the scale 74 when the weight per unit area of the measured material has the value $W_3$, substantially halfway between the values $W_{L1}$ and $W_{L2}$. The value of weight per unit area $W_3$ is referred to as the center scale value, and potentiometer 68 is referred to as the center scale-setting potentiometer or generally a center scale-setting unit.

It is to be noted that the bridge circuit 54 in FIG. 2 is set up so that when the pen and pointer assembly 72 is in the center of the scale 74, the slidewire tap 56a is in the center of slidewire 56, and the potential at the slidewire tap is the same as the potential at point 82 in the middle of the bridge circuit. At this time the output of bridge circuit 54, which functions as a variable voltage source, is simply the "center scale voltage" developed between potentiometer tap 69 and point 82, since there is no potential difference between point 82 and the tap 71 of potentiometer 70.

Potentiometer 70, which constitutes the elementary span-setting unit, determines the amount of deflection of the pen and pointer assembly 72 from the center of the scale in response to a given deviation of the material weight per unit area from the center scale value $W_3$. That is, the setting of potentiometer 70 determines how far the motor driven slidewire tap 56a must be moved away from the center position to produce a predetermined voltage increment between the potentiometer tap 71 and the center point 82 of the bridge. The total bridge circuit 54 output is of course the algebraic sum of the center scale voltage between tap 69 and point 82, and the deflection-from-center voltage between potentiometer tap 71 and point 82. With reference to FIG. 3, it is apparent that the setting of potentiometer 70 determines the slope of a line segment $xy$ which approximately coincides with the transmittance curve 80 over the portion thereof which includes the weight per unit area values $W_{L1}$ and $W_{L2}$. The simple gauge shown in FIG. 2 reads out on the recorder the approximate weight per unit area values determined by the line segment $xy$. Generally the error resulting from this approximation is only a fraction of 1 percent, which is sufficient for the usual purposes. If greater accuracy is required, at extra cost the gauge may be modified using known techniques to shape the line segment $xy$ so that it follows the curve of the transmittance function.

It is apparent from FIG. 3 that if a different material having a transmittance curve 76, say, is being measured, the center scale-setting value as well as the span-setting value will have to be changed to calibrate the scale 74 for weight per unit area values between $W_{L1}$ and $W_{L2}$, since the absorption curve 76 will now have to be approximated by a different line segment $x_1y_1$. Similarly, the center scale and span settings will have to be changed if it is desired to calibrate the scale 74 so that it can be marked off to represent values of weight per unit area between $W_{L4}$ at the left end and $W_{L5}$ at the right end. If a variety of weights of material are to be run on the same process machine, a plurality of scales as at 74 should be provided with each scale being provided with a different set of numbers from the other scales. It is further apparent that if at the same time a plurality of materials having different compositions are to be run on the process machine and measured by the gauge, a very large number of different combinations of center scale settings and span settings will be required.

For convenience herein, the term "range" refers to a combination of a center scale setting and a span setting for a particular scale to be used and a particular composition of material. A range is represented by one of the line segments such as $xy$ and $x_1y_1$ in FIG. 3. A "scale" is defined as a set of weight per unit area values such as $W_{L1}$ to $W_{L2}$ or $W_{L4}$ to $W_{L5}$ which is represented by a set of numbers which may physically be marked on a particular scale member as at 74. The number of ranges to be made available on a particular gauge is frequently the product of the number of scales desired and the number of material compositions to be measured on the gauge. Where the number of ranges required is less than about 20, the prior art circuit shown in FIG. 4 is conveniently used. This drawing shows a modification 54a of the bridge circuit 54 of FIG. 2.

In the circuit of FIG. 4, a number of center Scale-setting potentiometers represented by potentiometers 68a and 68b are provided. Additional potentiometers (not shown) which may be identified as 68c, 68d...68n may be provided where $n$ represents a number less than about 20. Similarly, the span-setting potentiometer is duplicated by providing a number of potentiometers as at 70a and 70b. Additional potentiometers (not shown) 70c, 70d...70n may also be provided. Proper combinations of the scale-setting potentiometers and span-setting potentiometers with preadjusted calibration settings thereon are selected by means of a range switch 84. In FIG. 4, the numeral 84 is applied to the dotted line which indicates the ganged connection of three multitap switch sections.

In many cases, however, such as in the example of a reversing mill which rolls metal strips of many different thicknesses and of many different alloys with significantly different compositions, several hundred ranges may be needed and are easily provided according to the invention as described below.

FIG. 2 further illustrates an elementary target-setting unit of a common type utilizing a bridge circuit 86 incorporating a repeat slidewire 88 whose movable tap is driven by the servomotor 58 which drives the measuring pen and pointer 72 of the recorder. The repeat slidewire bridge circuit further includes a target-setting potentiometer 90. The variable tap 90a of the target potentiometer is mechanically coupled to a target pen and pointer assembly 92 and to a manually adjustable target-setting knob 94. The error signal output from the bridge 86 which is applied to the automatic controller is taken between the movable tap of the repeat slidewire 88 and the target potentiometer 90. The system is arranged so that when the measuring pointer 72 and the target pointer 92 are in mutual alignment at any point across the width of the recorder scale 74, there is no voltage output from the bridge circuit 86. However, when the position of the measuring pointer 72 departs from the position of the target pointer 92, the bridge circuit 86 provides a DC error voltage output whose polarity depends on the direction of the deviation and whose magnitude is proportional to the amount of the deviation. The constant of proportionality between the deviation of the pointer and the error voltage output is adjustable by means of a voltage dropping rheostat 96 in series with the repeat slidewire bridge circuit power supply, represented by battery 98.

The foregoing description has provided only two examples of a so-called center scale-setting unit 38 and a span-setting unit 40, and likewise only one example of a target-setting unit 42 has been described and illustrated. It should be pointed out, however, that each of these units may be embodied in a variety of forms in different types of nucleonic gauging and controlling systems. Other instruments may not employ servomotor rebalancing arrangements in the measuring system 30 per se. For example, in the radiation gauge disclosed in the application of Frederick L. Maltby, Ser. No. 589,021, filed Oct. 24, 1966, the center scale and span-setting units are neither located in a servo null balance voltage generating bridge circuit, nor are they located in the principal feedback loop of the nucleonic gauge-measuring circuit. Moreover, in the nucleonic gauge of the Maltby application, the primary output of the gauge is not rendered in the form of a pen and pointer position analog, but as an output voltage. In the Maltby et al. circuit the elementary center scale-setting unit is identified as a potentiometer 46 and the elementary span-setting unit is a potentiometer identified by the numeral 66. While a target-setting unit is not disclosed in the Maltby application, it generally takes the form of an adjustable, precision DC voltage generator and a comparator for comparing the voltage from the target voltage generator with the voltage output of the gauge to derive the requisite error signal for the automatic controller. While the "center scale-setting unit" described therein is preferably a device for causing a recorder pen to be positioned at the center of its scale, or for causing the output voltage from a nucleonic gauge to be zero when a predetermined value of a measured property is presented to the gauge, this is obviously not absolutely necessary, for the center scale-setting unit may be any device used to supply a form of suppression to the detector output signal, either per se or in amplified or modified form. Points on a recorder or indicator scale other than the center thereof could provide an equivalent reference point, and another output voltage from the measuring circuit other than zero voltage could be used as well.

Figure 5:
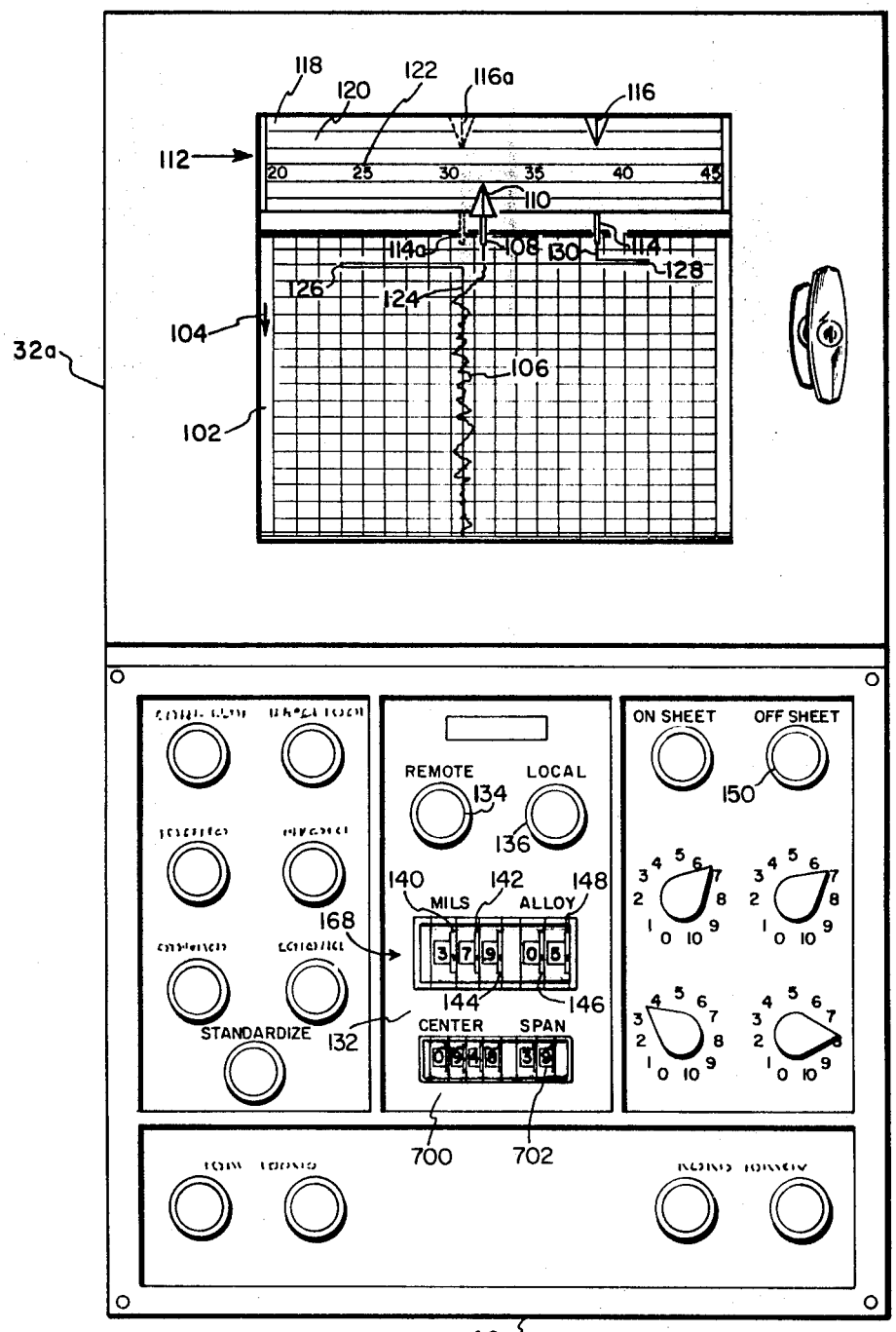
FIG. 5 is a front view of a typical strip chart recorder and operator's control panel of an instrument according to the invention.

Referring now to FIG. 5, there is shown a front view of a typical operator's control unit 46a for a nuclear radiation gauge and control system according to the invention. The operator's control unit 46a corresponds generally to the operator's control unit 46 shown in FIG. 1. On top of the operator's control unit is a recorder 32a which corresponds generally to the recorder 32 in FIG. 1. Recorder 32a is of the type which employs a continuously moving strip chart 102 which travels in the direction of the arrow 104, at a constant speed, or at a speed proportional to the speed with which the material 22a travels through the gap between source 26a and detector 28a. The wriggly trace 106 on the chart, as a result of the continuous measurement provided by the nuclear gauge, is drawn by a measuring pen 108, and the instantaneous value of the measured variable is represented by the position of an attached pointer 110 which moves horizontally with reference to a scale indexing arrangement 112 at the top of the recorder. The recorder includes a second pen 114 which constitutes a chart trace identification and target marking pen. The pen 114 also has an associated pointer 116.

The scale indexing system and pointer arrangement for the recorder is of the type disclosed in a copending application Ser. No. 573,073, filed Aug. 17, 1966, by Rex W. Dewey et al., now U.S. Pat. No. 3,363,257. The scale index assembly comprises a plurality of columns of thin transparent plastic strips as at 118 and 120, with the columns of strips stacked one behind the other. Each plastic strip carries a set of numerals as at 122. The numerals on the strips are selectively lighted by an indirect lighting system so that only the numerals on one scale index strip are lighted at any particular time. Since the plastic strips are transparent, the numerals on the strips behind those in the front column are visible through the transparent strip in front, and in this way a large number of scale indexes are available, with only one scale index being visible at a particular time. The pointers 110 and 116 have portions made of fluorescent material and are irradiated from behind the opaque portion of the recorder door with ultraviolet light which causes the index lines on the pointers to glow with distinctive colors. These and other features of the device not shown herein produce an effect of contrast and high readability.

The measuring pen 108 and pointer 110 are driven by a first servomotor as at 58 in FIG. 2. The other pen 114 and pointer 116 are driven by a second servomotor (not shown). The two pens 108 and 114 are filled with different colored inks. The pen 114 is used to identify on the chart record the scale being used when the trace is made, to identify the composition of the material where more than one composition is measured with the gauge, and to locate by drawing a straight line on the chart the target value or desired value of the material property being measured.

In the case of the traces shown, the vertical line 124 indicates a previous target value around which the trace 106 of the actual measured value has varied. The straight line 124 was drawn when the pen 114 and the pointer 116 occupied previous positions indicated by the dotted line positions of the pen and pointer at 114a and 116a. The remainder of the trace made by pen 114 indicates that a new specification has been set up. The short vertical trace at 126 indicates by its position the scale being used to measure the material according to the new specification. The next short vertical trace 128 indicates by its position the composition of the material being run according to the new specification. The vertical line 130, just starting, indicates the new target value for the measured property of the material being run according to the new specification.

Referring to the middle control panel 132 on the operator's control unit 46a, there are two lamps 134 and 136, respectively labeled REMOTE and LOCAL, one of which lamps will be illuminated. If the REMOTE lamp 134 is illuminated, it indicates that the new specification was set up by a remote device, such as the automatic supervisory control unit 48 of FIG. 1. If the LOCAL lamp is illuminated, it indicates that the new specification was set up locally on the operator's control unit 46a.

In order to select a new specification to be measured, the operator simply dials in the desired value of weight per unit area or thickness for the new run of material, using thumbwheel switches 140, 142 and 144. Each thumbwheel switch selects a corresponding decimal digit, and the selected digit appears as a lighted numeral. In the example illustrated, the thumbwheel switch 140 has selected the decimal numeral 3. Similarly, when various compositions of material are run, another set of thumbwheel switches as at 146 and 148 is used to select the material composition. In this example, the target setting is given in mils and the composition is identified as an alloy number.

The target weight or thickness and composition specification can be set up on the thumbwheel switches at any time, but the new specification is not set up on the gauge until a setup command is given. The LOCAL lamp 136 is a combination lamp and pushbutton which is pressed by the operator at the instant that it is desired to set up the new specification. Pressing this button causes the digital setup unit 44, FIG. 1, to operate the center scale and span-setting units 38 and 40 of FIG. 1 so as to set a new range combination adjustment into these units. At the same time, if necessary the previously lighted set of numerals as at 122 on the index scale 112 will be extinguished, and a new set of lighted numerals will appear to indicate the new scale of measurements. At the same time also the servomotor driven chart identification and target-marking pen and pointer assembly 114 and 116 will start to perform a programmed marking sequence.

As illustrated in FIG. 5, for example, the pen 114 will move from its previous dotted line position 114a where it was marking the target line 124 to the position where it marks the short vertical line 126 whose position indicates the new scale being used for measurement. The pen will then move to the position where it marks the short vertical line 128 to identify the new composition of material being measured. After marking the line 128, the pen 114 will then move to a position marking the straight vertical line 130 which indicates the target value of weight per unit area or thickness for the new specification. In accordance with a preferred arrangement where a relatively small number of scales are needed, the left-hand quarter of the chart is reserved for marking scale, as by the line 126, and the right-hand quarter of the chart is reserved for marking composition as by the line 128. According to this arrangement, the actual measurements are recorded substantially only in the middle half of the recorder chart unless for some reason the measured material should deviate widely from specification. It should be understood that any portion of the recorder scale may be used.

Where an automatic controller 36, FIG. 1, is used to automatically regulate the process, it is to be understood that the pen and pointer 114 and 116 mechanism is mechanically coupled to a target-setting potentiometer tap as at 90a in FIG. 2 so that the target for the automatic controller is also set up automatically at the end of the chart identification and target-marking sequence.

The chart identification and target-marking sequence performed by pen 114 and pointer 116 is automatically repeated whenever for some reason the gauge source and detector is moved to an off-sheet position so that the gauge is not measuring. For example, the marking sequence is initiated automatically when the operator presses the combination OFF-SHEET lamp and pushbutton 150, FIG. 5, to place the gauging head off-sheet.

Figure 6:
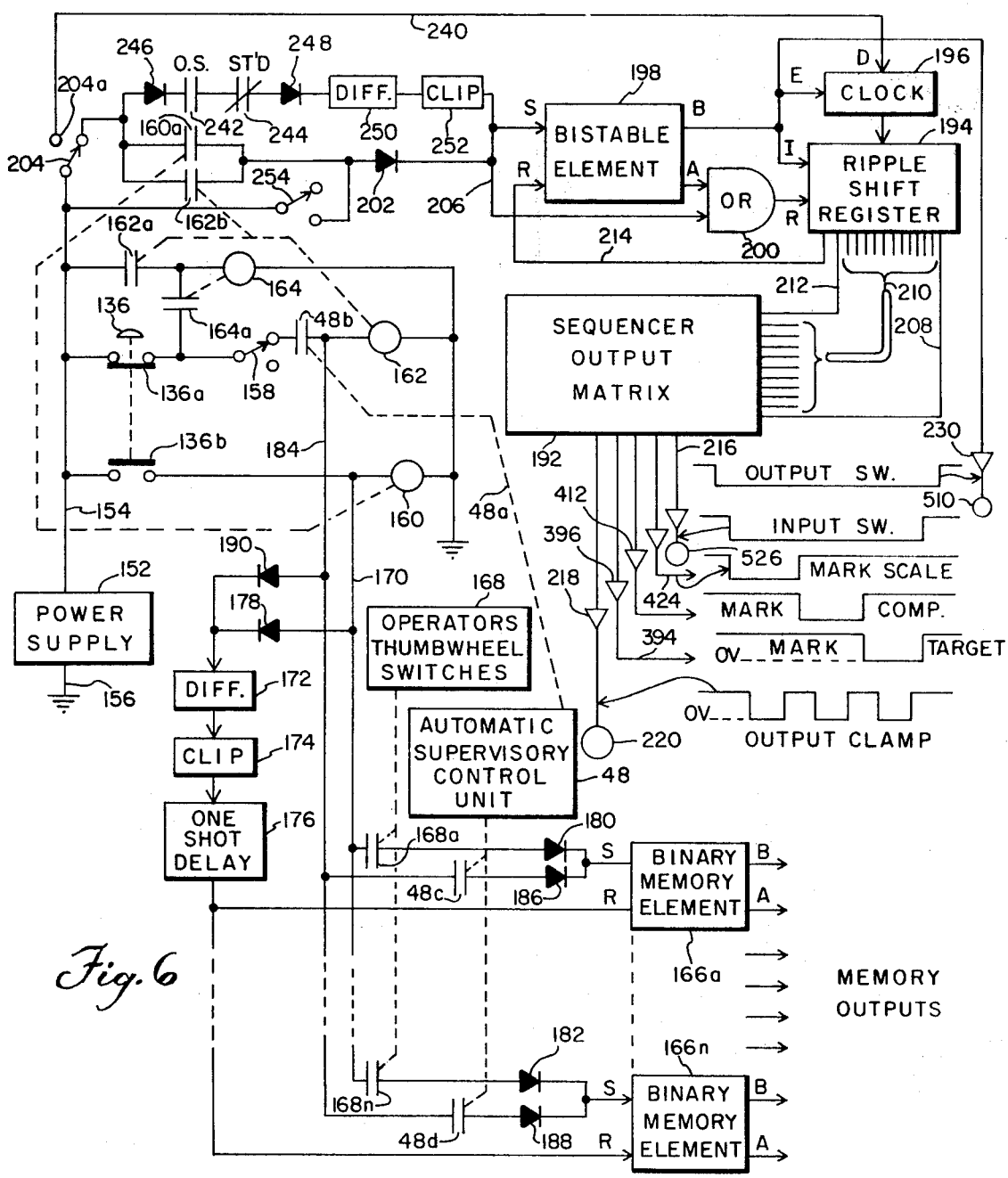
FIG. 6 is a partly schematic diagram of a portion of the input circuits of the digital setup system and the sequencer unit thereof.

Referring now to FIG. 6, there is shown at 152 a power supply which provides a DC voltage between a B+ output line 154 and a ground connection 156. The operator's local setup command pushbutton of FIG. 5 is here again referenced by the numeral 136. This pushbutton actuates a set of normally closed contacts 136a and a set of normally open contacts 136b. At 158 is an INHIBIT switch, not shown in FIG. 5, which can be used at the operator's station or other location to block out the automatic supervisory control unit 48 of FIG. 1, thus preventing this unit from setting up the gauge when such automatic setup is undesirable.

In FIG. 6, the automatic supervisory control unit is again shown as a box 48, and a dotted line 48a shows a mechanical connection between the box 48 and a set of normally open relay or switch contacts 48b. Contacts 48b are used by the automatic supervisory control unit to deliver the setup command signal in the same manner that such a command signal is given by pressing the operator's pushbutton 136.

Also shown are three relays 160, 162 and 164. Relay 160 has a set of normally open contacts 160a which are shown to be associated with relay 160 by a dotted line connection. Relay 162 has two sets of normally open contacts 162a and 162b shown to be associated with relay 162 by other dotted line connections. Relay 164 has a set of normally open contacts 164a shown to be associated with the relay by another dotted line connection.

Relays 162 and 164 perform a holding circuit function when the gauge is set up by the automatic supervisory control unit 48. This occurs when unit 48 delivers its setup command signal by momentarily closing contacts 48b. This energizes relay 162 through the normally closed pushbutton contacts 136a and INHIBIT switch 158. When relay 162 is energized, its contacts 162a close, in turn energizing relay 164. Relay 164 will then hold itself energized through its own contacts 164a and contacts 136a of the operator's pushbutton switch, even though relay 162 immediately drops out when contacts 48b open, in turn opening contacts 162a. Relay 164 has two further sets of contacts in a circuit not shown, including a set of normally open contacts in the circuit for the REMOTE lamp 134 of FIG. 5, and a set of normally closed contacts in the circuit of the LOCAL lamp 136 of FIG. 5. As previously pointed out, these lamps indicate whether the last specification was set up locally on the operator's control unit, or remotely by the automatic supervisory control unit 48.

A plurality of binary memory elements 166a–166n are provided to memorize the weight per unit area or thickness target value and the composition numbers selected by the use of the operator's thumbwheel switches, here shown in box 168, or by the automatic supervisory control unit 48. Any one of a number of binary memory elements well known in the art may be used, but for the purposes of illustration each of the binary memory elements as at 166a may comprise a bistable multivibrator circuit or flip-flop having a set input S, a reset input R, a first output A, which is energized to provide a voltage signal output when the bistable element is reset, and a second output B which provides a voltage signal output or logical one output when the bistable circuit is set by a signal applied to the set input S. While only two binary memory elements are shown, it is understood that 16 or more memory elements may be required to memorize the specification target setting, and a lesser number of additional memory elements will be required to memorize the composition information.

The switches, here shown as box 168, may be of the thumbwheel type which are manufactured and marketed under the trade name of EECoSWITCH Series 300 by Engineered Electronics Company, Santa Ana, California. When the thumbwheel switches 168 are operated, the switches provide a plurality of appropriate switch contact closures according to a selected output code. While any suitable output code may be used, it is preferred to use the basic binary coded decimal output or 8–4–2–1 code which is more universally compatible with various types of automatic supervisory control units as at 48. Thus, for example, each individual thumbwheel switch as switch 144 in FIG. 5, which is used to select one decimal digit, is provided with at least four sets of switch contacts as at 168a, which convert the decimal digit into output switch closures according to the basic binary code 8–4–2–1. Similarly, for each thumbwheel section as at 144, there will be four binary memory elements as at 166a. Similarly, to select any desired decimal digit, the automatic supervisory control unit 48 will be adapted to provide a set of momentary relay contact closures, the relay contacts being represented at 48c and 48d.

As previously described, the operator will use the thumbwheel switches 168 to select his target and composition settings. He will then provide the setup command signal by pressing pushbutton 136. This opens contacts 136a and closes contacts 136b. The opening of contacts 136a will drop out the relay holding circuits above described in case they are energized at the time, and contacts 136b will momentarily energize relay 160. The momentary signal which energizes relay 160 will also energize line 170 by connecting it momentarily to power supply line 154. This will provide power on switch contacts 168a for the purpose of setting up the appropriate binary memory elements 166a and 166n.

However, the actual setup of these memory elements is not completed immediately, since in the actual apparatus there are a great many parallel-running wires connected to line 170, and a delay is needed to allow transient pulses in these lines to be dissipated so that an incorrect setup does not result. To obtain this delay, there is provided a differentiating circuit 172, a clipper circuit 174 and a one-shot delay multivibrator 176 whose output is connected to all of the reset inputs R of the binary elements. The input of differentiating circuit 172 is connected through an isolation diode 178 to line 170, so that when the pushbutton contacts 136b are closed to energize line 170, a differentiated and clipped pulse will turn on the delay multivibrator 176. During an appropriate time delay of a few milliseconds, to allow the transients in the signal lines to be dissipated, multivibrator 176 provides a reset signal to all of the reset inputs R of the binary memory elements. These elements are constructed so that each element is positively reset when the reset signal is applied, regardless of whether or not there is a signal on the set input S. The resetting operation is completed while power still remains on line 170 and contacts 168a to 168n, while the operator is still pressing pushbutton 136 and holding contacts 136b closed. Power is thus applied through the coded switch contacts which are closed and through isolation diodes at 180 and 182 to the inputs S of the appropriate binary memory elements, thus setting the specification value and composition selected into the memory units.

The memory elements are set up in a similar manner when the selection is made, and the command signal given, by the automatic supervisory control unit 48 using this unit's output coding signal contacts as at 48c and 48d and thereupon delivering the command signal by closing the contacts 48b. When the operator's pushbutton 136 is not depressed and the contacts 136a thereof are closed, and when the INHIBIT switch contacts 158 are not open, the closure of contacts 48b will momentarily put power on line 184 to energize the contacts as at 48c and 48d, connected through diodes as at 186 and 188 to the set inputs S of the binary memory elements. When power is connected to line 184, the one-shot delay unit 176 is also energized, since differentiating circuit 172 is connected to line 184 through diode 190. The delay circuit 176 and the memory setup arrangement functions in the same manner as above described in the case where the setup is made on the operator's control unit. As was explained hereinabove, when the setup is made by the automatic supervisory control unit 48 the momentary energizing of relay 162 through contacts 48b causes delay 164 to pick up and hold for the purpose described, of indicating, by lighting lamp 134, that the last setup of the gauge was made by the REMOTE automatic unit.

The remainder of FIG. 6 is a schematic showing of a preferred form of sequencing unit for providing the timing and switching signals used in the automatic chart identification and target-marking sequence. The timing and switching signals are derived from a sequencer output matrix 192. The output matrix is driven by a ripple shift register 194 which is paced by clock pulses provided by a clock oscillator 196. Ripple register 194 has an initiate input I connected to one output B of a bistable element 198. The ripple register also has a reset input R connected to the output of an OR gate 200. Bistable element 198 is adapted to be switched "on" when a signal is received at its set input S, and is adapted to be switched off when a signal is received at its reset input R. Bistable element 198 is arranged to be placed in its "set" condition when the setup command is given. To this end, its set input S is connected through a diode 202 and the normally open relay contacts 160a and 162b to power supply line 154 through the contacts of a SEQUENCE HOLD switch 204.

As previously described, relay contacts 160a close momentarily when the setup command is given by pressing the operator's LOCAL setup pushbutton, and alternately, relay contacts 162b are closed momentarily when the setup command is given by the automatic supervisory control unit 48. Assuming that switch 204 is in the normal position shown, when one of these relay contacts closes, voltage is applied through diode 202 to line 206, which is connected to the set input S of bistable element 198 as well as to one input of the OR gate 200. This signal applied to OR gate 200 will be applied to the reset input R of the ripple register 194, and will reset the register if the same is not already reset by a signal at output A of bistable element 198 which is energized when bistable element 198 is in the reset condition. The signal on line 206 applied to the set input S of bistable element 198 will also trigger this element to its set condition. In its set condition, bistable element 198 will produce a signal at its output B and the signal at its output A will become zero. Since the delay contacts 160a and 162b close only momentarily, both inputs to OR gate 200 will now be zero and the reset signal will be removed from the reset input R of ripple register 194.

Ripple register 194 is a well-known device comprising a chain of bistable elements such as flip-flops. When the output signal appears at the B output of bistable element 198, a pulse is applied via initiate input I of the ripple register to the first binary element in the chain, thus triggering the binary element to its binary 1 state, that is, inserting a binary 1 bit into the first bistable element. The signal on output B of bistable element 198 is also applied to the enabling input E of clock oscillator 196, causing the clock to produce a series of time-spaced pulses which are fed to ripple register 194. These clock pulses cause the binary 1 bit which was inserted into the first bistable element of the register to be transferred from one bistable element to the next in succession. As each stage of the register receives the binary bit from the previous stage, the previous stage is reset.

At least one register output line as at 208 is connected to each bistable element in the register. As the binary bit progresses through the register, a signal is provided in succession on each output line, first line 208, then other lines in the group 210 and thence on the next to the last output line 212. The signal is present on only one line at a time, and exists for the period of time between successive clock pulses provided by clock 196. The final output line 214 provides a signal to the reset input R of the bistable element 198 to reset the same. When bistable element 198 is reset the signal on its output B is removed, and clock 196 is stopped. When the signal appears at A, the ripple register 194 is in turn reset.

The sequencer output matrix 192 is a conventional matrix which can be wired so that an output will be present on one or more of the matrix output lines as at 216 whenever a signal is present on any one line of a selected group of input lines as at 208 to 212 from the shift register. Thus as the binary bit inserted into register 194 progresses through the register, a plurality of square wave switching signals are provided at the output of the matrix 192. As is shown by the waveforms, the switching signals provided are identified as OUTPUT SWITCHING, INPUT SWITCHING, MARK SCALE, MARK COMPOSITION, MARK TARGET, and OUTPUT CLAMP. The waveforms shown appear at the outputs of transistor switch amplifiers as at 218 represented by the small open triangles. The switch amplifier 218 is connected to a relay represented by the small circle at 220.

Figure 7:
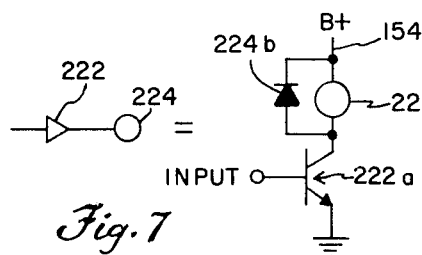
FIGS. 7 and 8 show circuit logic symbols used in the detailed drawings and the circuits represented thereby.

The combination of the small triangle 218 and the circle 220 is a logic circuit representation of a relay driver circuit as shown in FIG. 7. Here it is seen that the small triangle 222 represents a grounded emitter NPN transistor switch circuit 222a, and the small circle 224 represents the combination of a relay coil 224a with a diode 224b connected across the coil to suppress transient pulses caused by the inductive effect of the coil when it is deenergized. The coil and diode are connected between the B+ line 154 and the collector of the transistor. The emitter of the transistor is grounded, as is the negative side of the power supply 152. When there is no input signal to the base of the transistor, the relay coil is effectively disconnected from the ground side of the power supply and the relay is not energized. When there is an input signal to the base of the transistor, there is effectively a direct connection from the relay coil to ground and the relay is energized.

Figure 8:
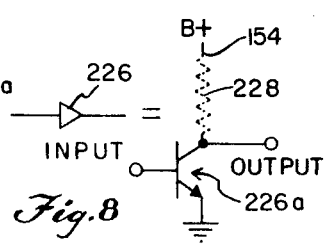

In FIG. 8 it is seen that a small triangle by itself as at 226 represents a grounded emitter transistor switch 226a. The collector of the transistor is connected through a load element such as a load resistor 228 to the B+ line 154. The load resistor 228 is shown in dotted lines, since it does not constitute a part of the transistor switch amplifier represented by the triangle 226. When there is no input signal to the base of the transistor the emitter to collector circuit is essentially open circuited, and the B+ voltage appears at the output. When there is an input signal to the base of the transistor the emitter is essentially short circuited to the collector causing substantially the entire B+ voltage to be dropped across the load resistor 228 and producing substantially zero voltage at the output.

Referring again to FIG. 6, the OUTPUT SWITCHING waveform appears at the output of a transistor switch amplifier 230 whose input is connected to the B output of bistable element 198. The other timing voltage waveforms appear at the output of transistor switch amplifiers as at 218, whose inputs are connected to the outputs of matrix 192. The respective functions of INPUT SWITCHING, OUTPUT SWITCHING, MARK SCALE, MARK COMPOSITION, MARK TARGET and OUTPUT CLAMP, to be explained later, are performed when the respective voltages represented by the waveforms shown are driven to 0 volts as shown by the OUTPUT CLAMP waveform which energized relay 220 when the output of switch amplifier 218 is driven to zero on receiving an input signal.

Reference has previously been made to SEQUENCE HOLD switch 204. This switch is used during calibration and checking of the chart identification and target-marking system in order to hold the sequencing unit at any portion of its sequence. For example, it may be desired to hold the sequence at the MARK SCALE portion of the sequence during which the short trace is drawn on the recorder at 126 in FIG. 5. This can be done without causing the sequence to be repeated by throwing the SEQUENCE HOLD switch 204 to the alternate contact 204a. This disconnects the power to relay contacts 160a and 162b as well as other circuits to be described, thus preventing a signal on line 206 which would reset the ripple register 194. At this time the switch 204 will connect power supply line 154 instead to hold circuit line 240, thereby providing disabling input D to the clock oscillator 196, thus preventing it from supplying shift pulses to register 194.

As is well known, provision is made in nuclear radiation gauges for moving the gauging head containing the radiation source and detector to an off-sheet position clear of the measured material. The gauge is periodically or occasionally moved off sheet by automatic means for purposes of automatic standardization, in a manner described, for example, in U.S. Pat. No. 2,829,268, issued Apr. 1, 1958, TO H. R. Chope. At other times the gauge may be placed off sheet by the operator for other reasons, such as for convenience in threading the machine, by the use of an operator's control such as the off-sheet pushbutton 150 shown in FIG. 5.

When the gauge is off sheet and therefore not measuring, it is highly desirable that the chart identification and target-marking sequence be repeated, since this is not only of great convenience to the operator, but a valuable help to persons viewing the chart later. Accordingly, provision is made for automatically initiating the chart-marking sequence when the gauge is placed off sheet. However, for reasons which sill appear later, it is not desirable to initiate the sequence when the gauge is off sheet for the purpose of automatic standardization.

At 242 there are shown the normally open contacts of an off-sheet (O.S.) relay whose functions are further explained in the aforementioned patent to Chope. Contacts 242 of the off-sheet relay are closed when the gauge is to be moved to the off-sheet position, and remain closed during the time that the gauge remains off sheet. The numeral 244 indicates the normally closed contacts of a standardize relay. The standardize relay is energized and its contacts 244 are open while the gauge is automatically standardizing. When the SEQUENCE HOLD switch 204 is in its normal position as shown, and if the standardize relay contacts 244 are closed as shown, when the off-sheet relay contacts 242 close, the voltage from the B+ line 154 will be connected through the switch, the relay contacts and a pair of diodes 246 and 248 to differentiating and clipping circuits 250 and 252 which are adapted to transmit a momentary pulse to line 206 so as to start the chart identification and target-marking sequence in the same manner that the sequence can be started by closure of relay contacts 160a and 162b as described previously. The differentiating and clipping circuits are provided so that a momentary pulse will reset the ripple shift register and set the bistable element 198 to start the clock. If a direct connection were made form the off-sheet relay contacts to line 206, since the off-sheet relay contacts 242 remain closed all the time the gauge is off sheet, power would remain on line 206 and the reset signal would be maintained during the time that the gauge was off sheet. Thus no sequencing action would occur.

For convenience in servicing the equipment, a manual SEQUENCE INITIATE SWITCH 254 is provided in a convenient location to that the sequence can be initiated manually. While the sequence unit has been shown and described as embodied in a preferred form, it is apparent that other types of sequencing units known in the art can be used instead. For example, a motor-driven cam-operated switching arrangement such as that described in the above-referenced Chope patent for sequencing the automatic standardization cycle can be used.

In FIG. 9, there is shown a column 166 of the binary memory elements corresponding to memory elements 166a and 166n of FIG. 6. Here the elements labeled 8A, 4A, 2A and 1A are used to memorize the least significant decimal digit selected by thumbwheel switch 144 of FIG. 5. The number is coded into these memory elements according to the basic binary code 8-4-2-1 for the reasons previously enumerated, although any other desired code may be used. Similarly, the memory elements labeled 8B, 4B, 2B and 1B are used to memorize the next to the least significant digit in the chosen target value which is set by thumbwheel switch 142 of FIG. 5. Likewise the memory elements 8C, 4C, 2C and 1C are used to memorize the most significant decimal digit set on thumbwheel switch 140.

The three "decades" of memory elements are sufficient to memorize any decimal number from 001 to 999 which may be set on the three-digit thumbwheel dials shown in FIG. 5. However, for a few applications, larger target numbers are needed, and hence additional switches and one or more additional memory elements may be required. For example, the addition of only one additional memory element 1D is sufficient to increase the memory capacity to include numbers from 0001 to 1999.

In the lower left-hand corner of FIG. 9, there is a further set of memory elements in a column $166_{co}$, and these memory elements are used to memorize the composition number chosen by thumbwheel switches 146 and 148 of FIG. 5. Here only three memory elements labeled 4E, 2E and 1E, associated with thumbwheel switch 148, FIG. 5, are shown to be actively used to memorize up to seven composition numbers. Again in this case, the number of memory elements to be used in a particular gauge depends on the number of different compositions for which the gauge is to be calibrated.

Connected to the outputs of the memory elements in the group 8C, 4C, 2C and 1C is a decoding matrix 260. This is a conventional resistor matrix in which the letter A at the intersection of a horizontal and a vertical conductor represents a resistor of a particular ohmage value connected between the horizontal and vertical conductors as shown in FIG. 10, according to a conventional notation. In a typical apparatus constructed according to FIG. 9, the "A" resistors used have a value of 270K ohms, the "B" resistors have a value of 3.9K ohms, and the "C" value resistors have a value of 120K ohms.

From the pattern of the "A" resistors shown in the decoding matrix 260, it is apparent that this matrix is arranged to convert the binary coded decimal output of the memory units to a decimal output wherein a signal on one of the nine vertical conductors represents a decimal digit between zero and eight. These vertical lines are connected to the inputs of transistor switch amplifiers in group 262. With reference also to FIG. 8, it is seen that the "B" resistors in group 264, connected to the outputs of the switch amplifiers, represent resistors as at 228 connected to the B+ line 154.

It is not necessary for the scale selection purposes described herein to translate the binary code to a decimal code as illustrated, but this is a preferred construction since it is frequently simpler to group and identify decimal information than binary information. This grouping and identifying is the essence of scale selection. To simplify the drawing, only the portion of the decoder matrix 260 which examines the output of memory elements 8C, 4C, 2C and 1C is shown. However, it is understood that the matrix 260 is extended so that the outputs of the other memory units can be examined also where required to make available the signals indicative of the values of the additional decimal digits.

For scale selection purposes, the outputs of switch amplifiers 262 are fed through input resistors 268 to phase inverter switch amplifiers in group 270, whose outputs are in turn connected to a scale selector matrix 272.

To illustrate a simplified technique for scale selection which can be used in a great many applications, matrix 272 is shown receiving inputs also from a further switch amplifier 274 and a phase inverter amplifier 276. Swtich amplifier 274 is a NOR circuit amplifier which receives signals at its two input resistors 278 from a pair of AND gates connected in the output circuits of memory units 8B, 4B, 2B, and 1B. The first AND gate comprises three diodes connected to the vertical line 280 in the matrix. Each diode is identified by a letter D, as is diode 282 which connects the vertical line 280 to the output line 284 of the 8B memory unit. Line 280 is also connected through a "B" resistor 286 to the B+ line 154. The diodes connected to line 280 and "B" resistor 286 are poled so that if any one of the memory element outputs connected to the diodes is zero, line 280 will be effectively short circuited to ground, thereby providing a zero signal to the one input of NOR circuit amplifier 274. The other AND circuit is similarly arranged by the diodes connected to the vertical line 288.

The purpose of the two AND gates and the NOR circuit with the diodes arranged as shown in the matrix, is to determine whether the binary coded decimal output of the memory elements 8B, 4B, 2B, and 1B represents a decimal number 5-or-greater or a number less than 5. Commonly, the recorder chart 102 of FIG. 5 is divided into 100 equal divisions by the vertical liens thereon, and the scales provided on the recorder are commonly numbered with sets of center half values such as 250–350 and 350–450, with or without the immaterial factor of having a decimal point located.

With such scales provided, if the gauge is set up with a target number 379, for example, a signal indicating the first digit 3 will be fed to matrix 272 from the output of the decimal digit 3 amplifier in the group 270 of phase inverter switch amplifiers. This signal indicates that one of the scales 300–400 or 350–450 must be used. To determine which of the two scales is to be used, the middle digit $\overline{7}$ is examined by the AND gate logic circuit described and found to be in the group of decimal digits greater than 5. Accordingly, the scale 350–450 will be selected as the proper scale. The "5-or-greater" indication is manifested by an output from NOR amplifier 274 and a zero output from phase inverter switch amplifier 276. Similarly, a "less-than 5" indication is provided by a zero output from amplifier 274 and an output voltage from phase inverter 276.

By rearrangement of the circuitry in the matrix, other numbers may be used as crossover values for selection of scales.

For example, if a pair of scales such as 330–430 and 430–530 are used, the circuitry may be rearranged to detect whether the middle digit is 3-or-greater or less than 3 so as to determine which scale should be used.

The automatically selected scale is uniquely determined by a voltage at the output of only one amplifier in a group of switch amplifiers 290 connected to the output lines of matrix 272. The scale output will appear as a signal on one of the scale selector output terminals in the group 292. Additional scales which may be required are provided either by using a greater number of horizontal conductors in matrix 272 (which are normally provided for the purpose) and/or by providing additional selector matrix sections, one of which is here indicated as a box 294.

As here illustrated, either matrix section 272 or 294 is used, depending on the binary state of the memory element 1D in column 166. This is done to identify most significant figure crossover points so that proper scales may be selected. For example, it may be necessary to identify the difference between 20–30 and 120–130. As shown, the "B" output line 296 of the 1D memory element is connected through an "A" resistor to all of the horizontal lines in the matrix, so that when there is a signal at the B output of the memory unit, a signal will be applied to all of the switch amplifiers in group 290, driving their outputs to zero regardless of the presence or absence of other signals which may be present at the input to the matrix, thereby disabling matrix 272. At this time, scale selection will be performed in matrix section 294. It is apparent that when additional target memory units are used further additional matrix sections as at 292 will be required.

It is seen that the outputs of switch amplifiers 262 are fed into matrix section 294 by suitable connections, here illustrated for simplicity as a cable 298, although an actual cable may not be used in the apparatus. It is noted that the "A" output line 300 of memory unit 1D is also fed into the second scale selector matrix section 294 to disable the same when scale selection is being done in matrix 272. The outputs of matrix section 294 are here shown as a box 302.

The scale outputs 292 as well as 302 are used to switch the selectively lighted lamps which illuminate the scale numerals of the recorder scale assembly 112 in FIG. 5. These lamps as at 304 are supplied from a suitable low-voltage lamp power supply 306 with one output line grounded as shown. The lamp circuits are switched by switching transistors as at 308. The input of each transistor switch amplifier is connected through a pair of isolation diodes as at 310 and 312 to its associated scale output terminal as the first scale output terminal 314. The junction of each pair of diodes as 310 and 312 is connected through a "G" value resistor to the B+ line 154. A lamp as at 304 is lighted when the input of its associated switch transistor as at 308 is not driven to zero by one of the switch transistor amplifiers in group 290. While for convenience only one lamp 304 is connected to the switch transistor amplifier 308, it will be understood that actually two lamps in parallel are used for each scale output, there being one lamp at each end of each of the scale strips as at 120 in FIG. 5.

The scale outputs are further fed to a scale mark selector matrix 316. A second section of the scale mark selector matrix is shown in box 318. According to the placement of the "A" resistors in the matrix 316 (and 318) selected scale mark output signals are fed to the scale mark input section, shown enclosed by the dotted line box 320, of a plurality of chart identification and marking logic circuits 322a to 322h. Circuits 322a to 322h generally are all identical and accordingly only the first circuit 322a is shown in detail within the dotted line box labeled 322a. Each of these circuits has an input terminal as at 324 in the group enclosed by box 320, connected to the matrix 316 (and 318). Only the first matrix output line 326 and the last output line 328 are shown connected to their respective terminals 324 and 330, with the other lines being shown for simplicity in a cable 332 which connects the matrix output line to the input terminals in box 320. In the actual apparatus such a cable is not necessarily used.

The scale outputs 292 and 302 are further fed into an "analog division and analog shift" selector matrix 340 having a second matrix section shown enclosed in box 342. By suitably placing a plurality of "C" resistors in matrix 340 (and 342) selected outputs may be obtained from the matrix for providing input signals to relay driver switch amplifiers 344, which selectively energize relays in group 346 which are referred to generally as analog division and analog shift relays. The scale outputs 292 and 302 are still further fed to range selector logic circuits here shown collectively in a box 348. While these connections are here indicated by the representation of cables 347 and 349 to simplify the drawing, it is to be understood that such cables are not necessarily used in the actual apparatus.

The range selector logic circuits also receive composition inputs obtained via switch amplifiers 350 connected to the output of a composition identification matrix 352 which in turn receives the outputs of the composition memory units $166_{co}$. The composition memory units, composition identification matrix and switch amplifiers 350 are similar to the memory elements 166, decoder matrix 260, and switch amplifiers 262 described hereinabove. This matrix 352 also converts the binary coded decimal inputs to decimal outputs in order to identify composition.

The outputs 354 of switch amplifiers 350, in addition to being fed to range selector logic circuits 348 are fed via lines as at 356 to a composition mark input section, comprising terminals enclosed within the dotted rectangle 358, for providing input signals to the scale, composition and target-marking logic circuits 322a to 322h. The connection of the one composition mark signal line 356 to its corresponding input terminal 360 of logic circuit 322h is shown. To simplify the drawing, the other signal lines are shown as enclosed in a cable 362 which connects to the input section 358, although an actual cable may not be used in the apparatus.

In addition to receiving a scale mark selector input and a composition mark selector input, each of the logic circuits 322a to 322h receives a target mark selector input from the A output of one of the memory elements in group 166. Thus, logic circuit 322a receives a target signal input via line 364 from the A output of the 8A memory element. Likewise, logic circuit 322b receives a signal via line 366 from the A output of the 4A memory element, and so on, with the last logic circuit 322h receiving a target signal from the A output of memory element 1B.

It is the function of these logic circuits to receive the target signals, the composition mark signals, and the scale mark signals and to operate a set of relay drivers 370. As shown by the dashed line 372, the relay drivers switch a digital potentiometer 374 connected in a bridge circuit 376. Bridge circuit 376 forms a part of a digital signal to analog position converter arrangement 378 which causes the chart identification and target-marking pen and pointer 116 on the recorder to move to the proper position for marking scale, composition and target.

Each of the relay driver circuits 370 includes a switch amplifier as at 380 with three possible input resistors 382, 384 and 386. Resistors 384 and 386 are connected to the B+ line 154 through "B" resistors as at 388. Resistor 382 is similarly connected to a switched B+ line 390 which is switched by a transistor switch 392 in response to a MARK TARGET signal on line 394. The MARK TARGET signal line 394 is also shown in FIG. 6 to be the output line from a transistor switch 396 connected to the output of the sequencer matrix 192. When the MARK TARGET signal is off, that is, when the voltage on line 394 is not zero, transistor switch 392 removes power from the switched B+ line 390 and accordingly no signal can be applied to the input of switch amplifier 380 via input resistor 382. When the MARK TARGET signal is on (driven to 0 volts) and power is applied to line 390, there will be an input through resistor 382 unless a voltage is fed from target signal line 364 via an input resistor 397 to a switch amplifier 398a, which in this case will drive the signal applied through input resistor 382 to zero. It will be noted that line 364 carries the complement output or A output of the memory unit 8A, so that a voltage is present when memory element 8A is reset. Thus there will be no input through resistor 382 to amplifier 380 when memory element 8A is turned off or reset.

Resistor 384 is connected to the unswitched B+ line 154 through a "B" resistor 400, and thus there will be an input via resistor 384 unless a voltage is applied to the input of switch amplifier 402. Such an input voltage can be applied either through an input resistor 404 or an "A" resistor 405. Resistor 404 is connected to a "B" resistor 406 which receives B+ voltage from line 154. However, if a voltage is applied to the input of switch amplifier 408, the amplifier 408 will drive the junction of resistors 404 and 406 substantially to a zero voltage level and accordingly there will be no input to switch amplifier 402 through resistor 404. The other input to switch amplifier 402 is connected by "A" resistor 405 to the MARK COMPOSITION signal line 410 which is in turn connected to the output of a switch amplifier 412. Amplifier 412 is also shown in FIG. 6, and its input is driven from the sequencer matrix 192 output. As appears from the MARK COMPOSITION waveform shown, switch amplifier 412 drives the voltage on line 410 to zero when the MARK COMPOSITION signal is on. Accordingly there is no input voltage to amplifier 402 via "A" resistor 405 during the MARK COMPOSITION interval. However, as aforesaid, there is a voltage present via input resistor 404 and "B" resistor 406 unless a voltage is present at the input of amplifier 408. Such a voltage will be provided to the input of amplifier 408 when there is a composition mark signal derived via composition mark selector matrix 352 and one of the grounded emitter switch amplifiers 350 whose collector is not grounded. Thus switch amplifier 402 has a voltage applied to its input at all times except during the MARK COMPOSITION interval, and then only when a composition mark signal is present from one of switch amplifiers 350. Also, since amplifier 402 is a phase inverter, there is no voltage applied through input resistor 384 to switch amplifier 380 except during the MARK COMPOSITION interval, and then only when a composition mark signal is present.

The logic circuits associated with the scale marking function, including input resistor 386, "B" resistor 388, switch amplifier 414, "A" resistor 416, resistor 418, "B" resistor 420 and switch amplifier 422 are connected in the same manner as the logic circuits associated with the composition marking function, except that the "A" resistor 416 is connected to the MARK SCALE signal line 424 from the sequencing unit and that switch amplifier 422 receives its input from scale mark selector matrix 316 (and/or 318). Likewise the circuit functions in the same manner, so that there is no voltage applied through input resistor 386 except during the MARK SCALE interval, and then only when a scale mark signal is present.

Resistors 384 and 386 and their counterparts in other logic circuits 322b through 322h are not always present. They are present only as needed to turn on relay drivers 370 according to the scale, composition and target-marking requirements.

According the another embodiment of the invention (not shown), in logic circuit 322a as shown in FIG. 9 the outputs of switch amplifiers 402 and 414 and their counterparts in logic circuits 322b through 322h are placed in a matrix similar to 272 or 352. The other lines in the matrix are the inputs to relay driver amplifiers as at 370—drivers 380, 440, 442 etc. In this manner the output of any of the scale or composition amplifiers 402a–402h (not shown) and 414a–414h (not shown) may be used to drive any one of the relays.

To summarize the operation of the chart identification and target-marking logic circuit unit 322a, the relay driver switch amplifier 380 receives no signal via any of its three input resistors 382, 384 and 386, and its associated relay 430 is deenergized at all times except during the MARK SCALE, MARK COMPOSITION and MARK TARGET intervals, and then only when a scale mark, composition mark or target mark signal is present during its appropriate interval. As was previously mentioned, the other logic circuit units 322b–322h, which also receive the B+ and switched B+ voltages as well as the MARK SCALE, MARK COMPOSITION and MARK TARGET inputs, function in the same manner.

The individual "outputs" of relay driver circuits 370 are indicated by dotted lines labeled 2'A, 4A, 2A, 1A, 2'B, 4B, 2B and 1B. This indicates that these relays provide an output in the binary coded decimal code 2'–4–2–1 which is sometimes referred to as the modified Aiken code. This preferred code, or some other code whose digits as 2, 4, 2 and 1 add up to nine, greatly simplifies the form of the digital potentiometer 374 for its intended purpose. The 2'–4–2–1 code, as used to represent a single decimal digit, is the same as the basic binary code except in the case of the decimal numbers 8 and 9, which are represented respectively by the binary numbers 1110 and 1111 instead of by 1000 and 1001 as in the basic binary code.

A simple translation of the 8–4–2–1 code signals provided by memory elements 166 into the 2'–4–2–1 code signals provided by relay drivers 370 is effected by the use of four diodes 432, 434, 436 and 438 and associated isolation resistors 433, 435, 437 and 439. Diodes 432 and 434 connect the output of the switch amplifier 398a to the outputs of the next two switch amplifiers 398b and 398c which are associated with the 4A and 2A relay driver inputs. The effect of this arrangement is that when amplifier 380 receives an input voltage, from the output of amplifier 398a, representing the decimal number 8 in the 8–4–2–1 code, this voltage is also applied as an input signal to the next two amplifiers, 440 and 442, thus changing the relay driver input signals representing 1000 and 1001 to 1110 and 1111. Since the diodes conduct in one direction only, output voltage from amplifier 398b or 398c is not applied to amplifier 380. A similar translation is effected by diodes 436 and 438 for the next decade.

As was previously stated, and as indicated by the dashed line 372, the contacts of the relays, as at 430, are used to switch a digital potentiometer 374 in the bridge circuit 376. The bridge circuit further includes what are referred to as "analog division and analog shift" resistance elements 450a, 450b, 452a and 452b, whose functions are more fully explained hereinafter with reference to FIG. 11.

As is shown by the dashed lines, in general, resistance elements 450a and 450b are switched by a set of relays 454, 456, 458 and 460. Similarly the resistance elements 452a and 452b are switched by a set of relays 462, 464 and 466. These relays operate during the MARK TARGET interval in accordance with selector signals from matrix 340 (and 342) which operate the relay driver amplifiers in group 344. However, during the MARK SCALE and MARK COMPOSITION intervals, according to one preferred scheme for marking scale and composition in accordance with FIG. 5, it is required that certain ones of the relays be positively deenergized regardless of the presence or absence of the selector signals.

According to the particular arrangement here illustrated, the relays 454, 464 and 466 which are required to be positively energized during the scale and composition marking interval are connected to the B+ line 154. Their driver amplifiers 344 are connected to signal line 474 through inverting amplifier 470 and resistors of matrix 340 (and 342). Signal line 474 is in turn connected through diodes 476 and 478 to the signal lines 410 and 424 which carry the MARK SCALE and MARK COMPOSITION signals generated at the sequencer output. As previously explained, these signal lines are driven to zero voltage during the respective composition and scale marking intervals. Hence, line 474 is at essentially zero voltage during both of these intervals. Inverting amplifier 470 changes the signal at its output 475 to essentially B+ line 154 voltage. As described previously, connection of a matrix resistor 473 from essentially B+ line 154 to the input of a relay driver 344 will cause the relay 454 to energize. Drivers 344 are essentially inverting amplifiers. Therefore a B+ signal input will cause the output to be approximately ground or zero potential. Thus, with one end of relay 454 connected to B+ line 154 and the other end connected to zero potential, the relay 454 will be energized.

The relays 456, 458, 460, 462 and 468, which are required to be positively deenergized during the MARK SCALE and MARK COMPOSITION intervals, receive power from a switched B+ line 480 which is controlled by switch transistor 472 and 482. Normally, a positive bias is maintained on the base of the transistor 482 via resistor 484 which is connected to the B+ line 154, so that the switched B+ voltage is maintained on line 480. The base of transistor 482 is further connected through inverting amplifier or switch 472 to line 475, so that when line 474 is driven to zero voltage during the MARK SCALE and MARK COMPOSITION intervals, line 475 is driven to B+ voltage, inverter 472 output is driven to zero voltage so that transistor 482 will cut off the switched B+ voltage to line 480. Thus, no matter what the input to drivers 344 may be as a result of scale signals 292 and matrix 340, the relays 456, 458, 460, 462 and 468 cannot be energized during the scale or composition mark intervals.

The bridge circuit 376 shown in FIG. 9 is of the automatic servo rebalancing type including a slidewire 490 with a slidewire arm or wiper which is driven by a servomotor 492. Motor 492 is energized by a servoamplifier 494 in response to any unbalance signal from the bridge circuit according to a well-known arrangement. According to the preferred embodiment of the invention described herein, the use of the servoamplifier 494 is time shared between the chart identification and target-marking servo arrangement and the gauge-measuring servo arrangement. This is appropriate since the gauge is not measuring while the chart identification and target-marking sequence is in progress.

Referring now to FIG. 11, the left-hand side of the drawing shows the bridge circuit 376 including the digital potentiometer 374 and the analog division and shift relays of group 346 in FIG. 9 with their respective switching contacts. The upper right-hand corner of the drawing shows a portion of the recorder 32a of FIG. 5 with its scale assembly 112, the radiation gauge-measuring pointer 110, and the identification and target indicating pointer 116. Included is a showing of parts of FIG. 2 including the radiation detector 28a, feedback amplifier 52 and bridge circuit 54. Included in the showing of the radiation gauge circuit is a standardizing sequence unit 500 for providing the timing and switching functions used in the automatic standardization of the gauge and which is explained in detail in the above-referenced U.S. Pat. No. 2,829,268 of H. R. Chope. The lower right-hand corner of the drawing shows the servoamplifier 494 with its input and output switching circuits. According to the preferred form of the present invention, the output of the amplifier is time-shared by four motors, including the chart identification and target-marking pen motor 492, the radiation gauge-measuring pen motor 58 which corresponds to pen motor 58 in FIG. 2, a "zero" servomotor 502 which is used to adjust the feedback amplifier 52 via potentiometer 62 to insure that there is zero output from the amplifier when there is zero input thereto, and a "source" motor 504 which is used to automatically adjust potentiometer 66 in the bridge circuit for source standardization purposes. As is shown by the dotted lines 506 and 508, respectively labeled "zero" and "source" it is indicated that any one of the three motors 58, 502 and 504 can be selected to be operated by the standardizing sequencing unit 500. This arrangement need not be explained herein, since it is described in detail in the Chope U.S. Pat. No. 2,829,268. A more extensive standardization arrangement wherein the output of the servoamplifier is time-shared among four motors is also explained in U.S. Pat. No. 2,951,161 issued Aug. 30, 1960 to George B. Foster et al.

In the circuit of FIG. 11, there is shown an output switching relay 510 which is energized during the period as shown by the OUTPUT SWITCHING waveform appearing in FIG. 6 at the output of relay driver switch amplifier 230. During the chart identification and target-marking sequence, relay 510 is energized from the B+ line 154 when amplifier 230 drives its output voltage to zero. Contacts 510a of relay 510 then short circuit the motors 58, 502 and 504. At the same time this relay opens its contacts 510b. At this instant, motor 492 is also short circuited by a set of normally closed contacts 220a of the output clamp relay 220. Also at this time, a dummy load resistor 512 is connected across the output of the servoamplifier to prevent open circuiting its output. The output clamp relay 220 is also shown in FIG. 6 to be energized when the OUTPUT CLAMP voltage waveform at the output of switch amplifier 218 is zero. At this time, relay contacts 220a open, connecting the servoamplifier 494 output across motor 492, and also relay contacts 220b close, thus short circuiting the dummy load resistor 512. The output of the servoamplifier 494 can now drive motor 492 causing it to drive the chart identification and target-marking pen and pointer 116. It should be noted on the time sequence chart of FIG. 6 that servoamplifier 494 output is placed across resistor 512 during all input switching periods. Also note that during relay 220 transit time—during which contacts 220a are open and contacts 220b are not yet closed—the amplifier 494 output is placed across resistor 512 and motor 492 in series. The latter condition will recur when relay 220 is deenergized. The result of this switching method is essentially to eliminate any undesirable motor action during switching of servoamplifier 494 input or output. Referring now to the input circuits of servoamplifier 494, one input line 514 to the amplifier is shown connected to the output of the radiation gauge feedback amplifier 52 via a line 516, a set of resistors 518, 519, 520, 522 and 524, and further through a set of normally closed contacts 526a of an input switching relay 526. The output of feedback amplifier 52 is taken with respect to ground, and hence the other input line 527 of servoamplifier 494 is connected to ground 156 through another set of normally closed contacts 526b of relay 526. This input connection by relay 526 is maintained while the gauge is measuring or standardizing.

The resistors 518 to 524 are referred to as gain changing resistors which control the input signal level to servoamplifier 494 which is obtained for a given signal output from feedback amplifier 52. As is explained in the above-referenced Chope U.S. Pat. No. 2,790,945, the output of feedback amplifier 52 has an amplitude which is proportional to the deviation of the mechanical members driven by the currently used one of servomotors 58, 502 or 504 from the position that the mechanical members should occupy according to the value of the input signal. As is well known in the servomechanism art, when the gain of the system is too high the system will oscillate, whereas if the gain is too low the system will be sluggish and unresponsive.

Referring to FIG. 3 and the transmittance curve 80 thereon, it is seen that a change in weight per unit area $W_{L1}$ to $W_{L2}$ produces a large change $O_1$–$O_2$ in the detector output. With reference to FIG. 2, to measure this extent of weight per unit area by causing it to drive the pointer 72 from one end of the scale 74 to the other, the span-setting potentiometer 70 must have its wiper 71 set well toward the top or slidewire wiper 56a end of potentiometer 70 to obtain a large portion of the slidewire deflection voltage. If on the other hand, the weight per unit area to be presented full scale is $W_{L4}$ to $W_{L5}$, the corresponding detector output variation $O_4$–$O_5$ is quite small, and accordingly potentiometer tap 71 will need to be set fairly well toward the bottom of the potentiometer 70 so as to pick off only a small portion of the slidewire deflection voltage. Thus the feedback amplifier receives a larger signal and produces a greater output for a given deviation of the mechanical servo from the balance point when measuring from $W_{L1}$ to $W_{L2}$ than it does when measuring from $W_{L4}$ to $W_{L5}$.

In order to keep the gain of the mechanical servosystem nearly the same when scales are changed, resistors 518 and 519 are adapted to be selectively short circuited by contacts 528a and 530a of a pair of gain changing relays 528 and 530. This is to cause the amplifier input current, for a given amount of deviation of the slidewire tap position from the null position, to be about the same on each scale.

Relays 528 and 530 are operated by a pair of switch amplifiers 532 and 534 also shown in FIG. 12. The relay drivers are operated according to the placement of "A" resistors in a gain selector matrix 536 connected to the scale selector outputs 292 and 302 of FIG. 9. Since the deviation between the different transmittance curves 76, 78 and 80 of FIG. 3 is greatly exaggerated for clarity, for gain changing purposes which do not require high accuracy, there is no substantial difference between one transmittance curve and another, and accordingly each scale as at $W_{L1}$ to $W_{L2}$ uses the same gain setting for servoamplifier 494 whether the measured material has transmittance curve 76, 78, or 80. While only two gain changing resistors 518 and 519 are shown in FIG. 11 to be selected by the scale outputs, at least five of such gain change resistors with different values are provided ordinarily. The additional relay drivers required to switch the additional resistors are shown in FIG. 12.

To provide the proper gain for the electromechanical servosystem when standardizing, gain resistors 522 and 524 are shunted by relay contacts operated by the standardizing sequence unit 500. The contacts operated during source standardization and zero standardization are arranged to short out the other resistors and to allow only the appropriate one of resistances 522 and 524 to be in circuit as required.

When the input switching relay 526, also shown in FIG. 6, is energized during the interval when the INPUT SWITCHING waveform is at zero voltage, the servoamplifier 494 has its input disconnected from the radiation gauging circuit and connected instead to the chart identification and target-marking system bridge circuit 376. When relay 526 is energized, its contacts 526a and 526b open, disconnecting line 540 of the radiation gauge circuit from amplifier input line 514 while relay contacts 526c connect line 540 directly to ground 156. Contacts 526b disconnect the servoamplifier input line 527 from ground, and contacts 526d connect it instead to line 542 from the digital potentiometer 374. Relay contacts 526e connect the other input line 514 of the servoamplifier to line 544, which is connected to the tap 490a of the slidewire 490.

This input switching is done while all of the motors 58, 502, 504 and 492 are shorted, and while the output of the servoamplifier is connected across the dummy load resistor 512. These connections are maintained also while any switching is being performed by the relays controlling the switching of resistors in the bridge circuit 376. In the bridge circuit, the switching is performed at the beginning and the end of each of the MARK SCALE, MARK COMPOSITION and MARK TARGET intervals. In the middle of each of these intervals, when no switching is being done in the bridge circuit, as shown by the OUTPUT CLAMP waveform, FIG. 6, relay 220 will be energized, disconnecting the short circuit across motor 492 and placing a short circuit across dummy load resistor 512. The output of the servoamplifier 494 is now connected across the servomotor 492 so that the latter can drive the slidewire tap 490a, the marking pen 114 (FIG. 5) and the pointer 116.

During the MARK TARGET interval, the servomotor 492 also sets up the target for the automatic controller, if such a controller is used, in the same manner that the target is set up manually by control knob 94 in the simplified circuit of FIG. 2. It is realized, of course, that the chart identification and target-marking arrangement is of great benefit to the process machine operator and to persons later viewing the chart even though no automatic controller is used with the gauge.

The bridge circuit 374, in combination with the servoamplifier and rebalancing motor, constitutes a highly versatile digital signal to analog converter, particularly adapted for the purposes described herein. The usual type of electromechanical converter is unsuited to the present purpose because with the multiscale system required in the radiation gauge a given digital input number does not always represent the same position of the output member such as the pointer 116. On the contrary, where there are a multiplicity of scales in various combinations required in a particular gauge, it is not unusual for a given digital number to be required to position the pointer 116 at several different positions because of the complicated overlapping of scales required. To perform such a function with the ordinary digital-to-analog converter, the digital input numbers would first have to be multiplied by conversion factors relating to the input numbers to the fixed converter position output code, thus requiring the use of the arithmetic elements of a digital computer, which is not generally available to all users of radiation gauges. The same results are obtained using only simple logic circuits when the digital-to-analog converter of FIG. 11 is used.

The digital potentiometer 374 utilizes a conventional arrangement of resistors paralleled by switched contacts, and with the resistor values selected according to the modified Aiken code 2'-4-2-1. The digital potentiometer comprises pairs of resistors with each resistor in each pair having the same value, and with each pair being switched by a relay such as relay 430. The first decade of the potentiometer includes resistors having values R, 2R, 4R and 2R as shown on the drawing. The second decade of the potentiometer utilizes resistor values 10R, 20R, 40R and 20R as shown on the drawing. Since when one resistor in a pair is shorted by the contacts of its associated relay, the other resistor of the same value in the pair has the short circuit across it removed by the contacts of the same relay, the total resistance of the potentiometer appearing between points 374a and 374b is constant. This is only true to the degree of the precision of the resistor pairs, of course. However, when a voltage is applied to point 374a with respect to point 374b, the voltage at point 374a can be divided into 100 equal increments, and any whole number of these increments can be applied to the output 374c of the potentiometer which is connected to its output line 542. This of course assumes that there is no load on the potentiometer, which there is not when the bridge circuit 376 is balanced.

Voltage is fed to the digital potentiometer from a DC power supply 550 through analog division resistors as at 552 and 554. Four of these resistors are connected in series between the positive side of the power supply and the one end 374a of the digital potentiometer. Likewise, four of these resistors as at 554 are connected between the negative side of the power supply and the other end 374b of the digital potentiometer.

In the example herein given where it is desired to mark the target value or specification value in the center half of the recorder chart 102, with reference to the center half of the index scale assembly 112, the value of each of the resistors as at 552 and 554 is chosen to have a resistance of R', where R' is nominally 24 times as large as the unit resistance R of the digital potentiometer. The four resistors as at 552 connected between the positive side of the power supply and the end 374a of the digital potentiometer have a combined resistance value of 4R' or four "resistance units" where the resistance unit is R'. The digital potentiometer 374 is shunted by a resistor 556 so that its total resistance, including the resistance of a resistor 558 which is not arranged to be shorted by relay contacts, is precisely equal to 4R' or four "resistance units." Now each of the 99 equal increments of the voltage between the end 374b of the digital potentiometer and its output 374c is precisely one twenty-fifth of the voltage which will appear across one of the resistors as at 552 having the unit resistance value R'.

Each end of slidewire 490 is connected to the power supply through an end rheostat as at 556 and three resistors 558, 560 and 562. The slidewire has a total resistance somewhat greater than 2R', this being the reason for selecting the values of R' and R in the first place. The mechanical connection between the slidewire tap 490a and the marking pen and pointer 116 is adjusted approximately so that when the tap 490a is located midway between the ends of the slidewire 490, the pen and pointer 116 is centered with reference to the scale assembly 112.

The final adjustments, for obtaining the proper pen and pointer position with reference to the position of the tap 490a with the bridge electrically balanced, are made electrically by using the centering rheostats as at 556 at the ends of the slidewire and by adjusting the value of a shunting resistance comprising resistors 564, 566 and a rheostat 568. When the adjustments are completed, the resistance between a point 570 and the quarter point 572 of the slidewire resistance is precisely R'. Point 572 is the slidewire tap position which corresponds to the quarter line 574 on the recorder index scale assembly 112 and on chart 102. Likewise when the adjustment is completed the resistance between a point 576 and the other quarter point 578 of the slidewire tap position is precisely R'. Also the resistance between the quarter points 572 and 578 on the slidewire is precisely R'.

The servoamplifier 494 is set up to follow the output of digital potentiometer 374 by holding the sequence at MARK TARGET by the aforementioned method. The electrical adjustment is made by first deenergizing all of the relays as at 430 in the digital potentiometer 374, deenergizing relays 454, 456, 458 and 460, energizing relays 464 and 466 (the condition of relay 462 is immaterial), and noting the position of pointer 116 when the servosystem including motor 492 has driven the slidewire tap 490a to the point where the bridge is balanced and a fixed position of pointer 116 is maintained. The pointer position will be somewhere near the quarter mark 580 on the scale index 112. All of the relays as at 430 in the digital potentiometer 374 are then energized and the position of pointer 116 is again noted when the servomechanism comes to balance at the new position. By using the "centering" rheostats as at 556 at the ends of the slidewire to adjust the lateral positions of the two balance points with reference to the scale index and the chart, an adjustment is obtained such that when all of the relays in the digital potentiometer are deenergized the pen and pointer 116 will come to rest exactly at the quarter mark 580 and when all of the relays in the digital potentiometer are energized, the pen and pointer will come to rest at a point in the vicinity of the other quarter mark 574 which is exactly ninety-nine one-hundredths of the distance from quarter mark 580 to quarter mark 574. The adjustments of the slidewire end rheostats are interdependent, and accordingly an adjustment of one may require readjustment of another. However, by successive approximations the balance points can be very quickly set by observing the movement of the pen and pointer 116 produced by each slight movement of one of the adjusting taps of the rheostats. Upon completion of this sequence the resistance values between points 576 to 578, 578 to 572, and 572 to 570 are all equal.

It remains now to establish the resistance between points 576 and 570 to precisely 3R'. This may be readily accomplished in the following manner. Energize relays 462 and 466.

This will establish point 578 approximately R' from the negative power supply terminal and point 572 approximately 2R' from the positive power supply terminal. It is desired to establish these two points at precisely R' and 2R' from their respective power supply points. If this is achieved, then it is readily seen that, since resistor 560 is precisely R', the resistance between points 576 and 570 will be precisely 3R'. In order to achieve these desired results the relays 456 and 460 must be energized. This places the entire power supply voltage across the digital potentiometer, which is equivalent to 4R'. Therefore if relays 430 are energized so that output 374c is precisely at 2R', which is the midpoint of resistance and voltage, then servoamplifier 494 should drive the slidewire tap 490a to a point near 572 (574). We have shown previously that when point 572 is precisely 2R' from positive (or negative) power supply terminal during this procedure, then the setup will be completed. Adjustment of rheostat 568 to drive slidewire tap 490a to precisely point 574 (572) will accomplish the desired results. This is apparent since it has already been set up that resistances between 576 to 578 and 578 to 572 and 572 to 570 are equal. The final adjustment makes 576 to 572 equal to 572 to 570 plus resistor 560 which is R'.

In the example given, the chart 102 is printed with 100 equal spaces between the vertical lines thereon. There are 50 spaces between the lines defining the middle half of the chart between the quarter marks 574 and 580. By energizing the relays as at 430 in accordance with a decimal number coded according to the 2'–4–2–1 code, the pen and pointer 116 can be made to come to rest precisely on any one of the 49 chart lines between the quarter marks 574 and 580, or it may be made to come to rest precisely in the center of one of the 50 spaces between the chart lines. This gives a resolution of one-half chart division for marking target.

When setting up the bridge by the initial procedure just described, with relays 454, 456, 458 and 460 energized so that their contacts are closed to short out their respectively paralleled resistors, the bridge is operated in what is referred to as the "no division" mode, in which all of the voltage increments available from the digital potentiometer between its one end 374b and its midpoint 374c are converted by the automatic rebalancing slidewire arrangement to positions of the pen and pointer 116 located between the quarter marks 574 and 580.

By selecting other combinations of relays 454–466, other operating modes may be achieved. These other operating modes are referred to as the "first half," "second half," "first quarter," "second quarter," "third quarter" and "fourth quarter" operating modes. The latter part of the setup procedure utilized the "second quarter" mode. These respective operating modes are obtained when the relays are energized according to the following truth table in Table 1.

TABLE 1

| Mode: | Relay | | | | | | | Resistance units | | | |
|---|---|---|---|---|---|---|---|---|---|---|---|
| | 454 | 456 | 458 | 460 | 462 | 464 | 466 | $R_A$ | $R_B$ | $R_C$ | $R_D$ |
| No division | 0 | 0 | 0 | 0 | X | 1 | 1 | 4 | 4 | 1 | 1 |
| First half | 0 | 1 | 1 | 0 | X | 1 | 1 | 0 | 2 | 1 | 1 |
| Second half | 0 | 0 | 1 | 1 | X | 1 | 1 | 2 | 0 | 1 | 1 |
| First quarter | 1 | 1 | X | 0 | 0 | 0 | 1 | 0 | 1 | 3 | 1 |
| Second quarter | X | 1 | X | 1 | 1 | 0 | 1 | 0 | 0 | 2 | 1 |
| Third quarter | X | 1 | X | 1 | 1 | 1 | 0 | 0 | 0 | 1 | 2 |
| Fourth quarter | 1 | 0 | X | 1 | 0 | 1 | 0 | 1 | 0 | 1 | 3 |
| Mark scale and mark composition | 1 | 0 | X | 0 | X | 1 | 1 | 1 | 1 | 1 | 1 |

In Table 1, the binary number 0 indicates that a relay is deenergized and its contacts are open. The binary number 1 indicates that the relay is energized and that its contacts are closed. The symbol X is a "don't care" symbol which indicates that it makes no difference whether the relay is energized or deenergized. The resistance values set forth in the table are given in terms of the resistance unit R'. The locations of the resistances $R_A$, $R_B$, $R_C$ and $R_D$ are indicated on the drawing. It is to be noted that the resistance $R_C$ appears between the right quarter point 572 on the slidewire and the positive terminal of the power supply 550. Likewise the resistance $R_D$ appears between the left-hand quarter point 578 on the slidewire and the negative terminal of the power supply. The resistance $R_A$ appears between the positive terminal of the power supply and the end 374a of the digital potentiometer. The resistance $R_B$ appears between the negative side of the power supply and the other end 374b of the digital potentiometer.

The term "no division" indicates that all of the voltage increments available from the digital potentiometer can be converted by the slidewire rebalancing system to positions of the target pen and pointer 116 in the middle half of the chart and scale index between the quarter marks 574 and 580. This is so because the resistance $R_A$ is four units, resistance $R_B$ is four units, and the resistance of the digital potentiometer 374 is four units. Thus one-third of the power supply voltage appears across the digital potentiometer. Likewise, with resistors 560 and 562 in $R_C$ shorted by the contacts of relay 464 and with their corresponding resistors in $R_D$ shorted by contacts of relay 466, the resistance of $R_C$ is one unit, the resistance of $R_D$ is one unit, and the resistance of the center half of slidewire 490 is one unit. Hence one-third of the power supply voltage appears across the center half of the slidewire 490, which corresponds to the middle half of the recorder chart where the target mark is to be placed.

The term "first half" indicates that only the first half of the voltage available from the digital potentiometer, in response to the least significant digits in the target specification number dialed in by the operator on the thumbwheel switches as at 144, FIG. 5, is presented to the slidewire rebalancing device for the purpose of marking the target in the middle half of the chart 102. That is to say, a decimal number of from 0 to 49 when applied in binary coded decimal form to the digital potentiometer relays, will cause the pointer 116 to come to rest on one of the vertical lines on the recorder chart between lines 574 and 580. If a larger decimal number is applied as an input via the digital potentiometer relays, the pointer will come to rest at a point outside of the center half beyond the quarter mark 574 in a region which is not used for target-marking purposes. This region, however, is used for the scale identification marking.

Similarly, the term "second half" indicates that it is the second half of the voltage available from the digital potentiometer, in response to binary-coded decimal numbers 50 or greater, which is used to position the pointer in the middle half of the chart for specification target-marking purposes. It is apparent that in the "first half" or "second half" modes of operation, the converter has only half of the resolution, in terms of the chart 102, which is obtained in the "no division" operating mode.

The terms "first quarter," "second quarter," "third quarter" and "fourth quarter" applied to the operating modes, indicate that only the respective quarter of the voltage available from the digital potentiometer can be presented to the rebalancing slidewire for the purpose of marking target in the center half of the scale. In some of the quarter modes, the resolution is decreased to two chart divisions so that a target value can only be marked at every other chart line in the center half of the chart if the digital potentiometer has only two decades. If three decades are used, values can be marked every two-tenths of a chart division.

A better understanding and appreciation of the converter operation is obtained from a study of Table 2.

TABLE 2

| Scale | Extent | Resolution Full Scale | Mode | Decades Required |
| --- | --- | --- | --- | --- |
| 5–10 | 5 | 1% | Second half | 2 |
| 5.0–10.0 | 5 | 0.1% | Second half | 3 |
| 10–15 | 5 | 1% | First half | 2 |

Table 2 — Continued

| | | | | |
| --- | --- | --- | --- | --- |
| 10.0–15.0 | 5 | 0.1% | First half | 3 |
| 15–25 | 10 | 0.5% | No division | 2 |
| 25–35 | 10 | 0.5% | No division | 2 |
| 30–40 | 10 | 0.5% | No division | 2 |
| 30.0–40.0 | 10 | 0.05% | No division | 3 |
| 35–45 | 10 | 0.5% | No division | 2 |
| 45–55 | 10 | 0.5% | No division | 2 |
| 50–75 | 25 | 2% | Third quarter | 2 |
| 75–100 | 25 | 2% | Fourth quarter | 3 |
| 100–125 | 25 | 0.2% | First quarter | 3 |
| 125–150 | 25 | 0.2% | Second quarter | 3 |

Table 2 lists a few typical scales and the operating modes used to mark the specification target thereon. For the purpose of the present explanation, the term "extent" is used to specify the difference between the number appearing at the right-hand quarter mark of the index scale and the number which is placed at the left-hand quarter mark. As previously described with reference to the description of FIG. 5 and FIG. 9, these numbers will appear as lighted numerals on index scale assembly 112.

In general, scales which have an extent of 5 require first-half or second-half modes of operation. Scales which have an extent of 10 use "no division" operation. Scales which have an extent of 25 require first, second, third or fourth quarter modes of operation.

If more than two decimal digits are required to specify the high limit of the scale, the scale is beyond the capability of a two-decade digital potentiometer, and an additional decade comprising a set of eight resistors and four relays is required. Such an additional decade is indicated by the dotted line box 582. The third decade section is simply an extension of the potentiometer shown and is connected across the bottom ends of the 20R resistors. It is indicated that a pair of jumpers 584 and 586 can be removed to disconnect the 20R resistors from the output point 374c when the extra decade is added. Of course the connection to the output point 374c has to be made in the additional decade 582.

The addition of the third decade increases the resolution of the converter by a factor of 10, so that a resolution of one-twentieth of a recorder chart division is achieved in the "no division" operating mode, one-tenth of a chart division in one of the "half" operating modes, and one-fifth of a chart division in one of the "quarter" operating modes. Thus the converter has as much resolution as is needed to suit the number of significant digits in the input number.

Where the scale limits are defined by only two significant digits, the third decade 582 is shorted by contacts 468a and 468b of relay 468 shown by the dotted lines in the drawing. Also shown by dotted lines is a resistor 588 which is connected across the digital potentiometer through normally closed contacts 468c or relay 468. Thus when relay 468 shorts out the third decade of the digital potentiometer, its contacts 468c remove the additional shunt resistance 588 across the potentiometer so that the potentiometer has the same four units' resistance whether the third decade is being used or shorted out.

Where the digital potentiometer 374 has the third decade 582, it is understood that four additional chart identification and target marking logic circuits as at 322a, FIG. 9, will be required. If these were to be shown on the drawing, they would be identified as 322i, 322j, 322k and 322-1, and they would receive target signal outputs from the memory elements in group 166 identified as 8C, 4C, 2C and 1C.

In addition to the modes of operation listed for marking target, the bridge circuit 376 has an additional operating mode which is used for marking scale and marking composition. The operating mode used for marking scale and composition can of course be selected to suit the requirements of a particular measuring application. In the common "mark scale and mark composition" operating mode shown in Table 1, resistances $R_A$ and $R_B$ are each one unit, while resistances $R_C$ and $R_D$ are likewise both one unit. In this mode, the 99 increments of voltage available from the first two decades of the digital potentiometer 374 may be used to position the target pen on any one of one hundred vertical lines on the recorder chart. In this mode, if less than 25 scales are used, they will be identified by ink marks placed on the chart lines on the left-hand quarter of the chart in the manner illustrated in FIG. 5. Similarly, if less than 25 compositions are used, the marks will be placed on the right-hand quarter of the chart. If more scales and more compositions are used, the additional marks are placed in the middle half of the chart. In the event that the scale mark and composition mark positions have to overlap, the scale marks can be identified from the recorder trace, since the scale marks are the first to be placed on the traveling chart. Of course, three decades could be used permitting composition and scale mark positions to 1/10 percent of full recorder scale.

It should be noted in Table 2 that several scales have an extent of 10, starting with 5 and ending with 5 and are in the "no division" mode. In order to do this the BCD input to the digital potentiometer 374 must be converted in such a manner that the digit 5 looks like a 0, 2 looks like a 7, 4 like 9, etc. A matrix and conversion unit (not shown) between the memory 166 (FIG. 9) and the target logic input resistors as at 397 on line 364 will accomplish this conversion. Of course the matrix will include all memory 166 outputs which require this conversion.

The same would be true of a scale of 13 to 23. It has an extent of 10 and a "no division" mode. The target matrix and conversion unit would convert the 3 to look like 0, 4 to look like 1, etc. This is essentially a binary weighting technique and is well known to those skilled in the art.

As shown in FIG. 13, the scale selector signal outputs are shown coming out of a box identified with two reference numerals 292 and 302 which correspond to the scale selector output terminal groups 292 and 302 of FIG. 9 The scale selector signal outputs are arranged so that there is one output signal line as at 600 for each scale to be selected. All of these lines are maintained essentially at ground potential except for the one line associated with the selected scale, which line will have essentially the B+ voltage applied to it. On the drawing, the lines associated with the scale to be selected are numbered 1, 2, 3, ...$n_1$.

The composition selector signal outputs are shown as coming from a box identified by the reference numeral 354 used in FIG. 9 to indicate the composition selector signal output lines from switch amplifiers 350. There is a composition selector output line as at 602 for each of the compositions to be selected. The composition output lines are numbered 1, 2, 3, ...$n_2$. All of the composition selector output lines as at 602 are at substantially zero potential except for the line associated with the selected composition, which signal line will be substantially at the voltage of the B+ line 154.

Running vertically on the drawing are a plurality of signal lines as at 604 referred to herein as range lines, and are numbered 1, 2, 3, ...$n_3$. Each of the range lines is connected through a "B" resistor as at 606 to line 609 which is B+ through transistor switch 607 which is open when scale output $n_1$ is positive.

As previously explained with reference to FIG. 3, a range can be identified by specifying the scale to be used and the composition of the material. The scale selector signal output lines and the range selector lines define a first matrix portion 608 in which diodes as at 610 can be placed. The diodes are poled so that when the scale output line as at 600 is driven to ground potential by its associated switch amplifier in group 290, FIG. 9, it shorts the range selector line as at 604 to ground despite the presence of the B+ voltage on the other end of the "B" resistor 606.

Similarly, the range lines and the composition lines constitute a second matrix section 612 in which diodes as at 614 can be placed in the same manner. Thus if either the scale output line 600 or the composition output line 602 is driven to ground potential, there can be no B+ voltage on range line 604 despite the fact that the B+ voltage is applied to the other end of the "B" resistor 606. However, if there is a voltage present on both the scale 3 output line and the composition 1 output line 602, neither of the diodes 610 and 614 will short the range line 604 to ground, and hence line 604 will be substantially at the voltage of B+ line 609, thus providing a range selector signal on line 604.

Since only one scale output line has a voltage on it at a particular time and only one composition line has a voltage on it, only a range line as at 604 which has a diode connected both to the energized scale line and the energized composition line will have a voltage on it. The reason for this is that all of the other range lines as at 616 will have at least one diode as at 618 connected to one of the other scale output lines as diode 618 is connected to the scale 2 output line. Likewise all other range lines as at 620 will have a diode as at 622 connected to at least one of the composition output lines, as diode 622 is connected to composition output 3. Thus every range line, except the one range line as at 604 which has diodes as at 610 and 614 connected to both the energized scale output line and the energized composition line will be shorted to ground by at least one diode.

As was previously explained in the description of FIG. 2 and FIG. 3, each range automatically selected by the logic circuits requires a particular center scale potentiometer 68 setting and a particular span potentiometer 70 setting. These settings for center scale and span are uniquely determined by the specific transmittance function as at 80, which is plotted for a particular material of a certain composition on a particular gauge.

According to one preferred embodiment of the invention according to FIG. 13, a digital potentiometer 668 replaces the potentiometer 68 of FIG. 2. Digital potentiometer 668 is substantially identical to the digital potentiometer 374 previously described in the digital to analog converter, except that the digital potentiometer 668 may require more decades. Commonly, four decades are used. Again in this case relays as at 672 are used to perform the switching in the digital potentiometer and the relays are driven by relay driver switch amplifiers as at 674. The digital potentiometer and its associated relays are also arranged in the modified Aiken code 2'-4-2-1. As is indicated adjacent to the dotted lines as at 676 connecting the relays 672 to the digital potentiometer 668, only the first decade of relay drivers is shown identified as 2'A, 4A, 2A and 1A. A relay driver circuit for the fourth decade is indicated to have a relay output 2'D.

A center scale selector matrix 676 is used to translate the range selector signal on one of the range selector lines as at 604 into the required pattern of energized and deenergized relays controlling digital potentiometer 668. This is done using the well-known truth table for converting decimal numbers into the 2'-4-2-1 binary coded decimal code according to the decimal center scale setting number as at $O_3$ shown in FIG. 3.

As was previously stated, only one of the range lines 604 will be energized at a given time. If there is an "A" resistor as at 678 connected between the range line as at 604 which is energized and the input line as at 680 to one of the relay drivers switch amplifiers as at 674, the relay will be energized. This is so despite the fact that a number of other "A" resistors as at 682 may be connected to the same amplifier input line as at 680, since the other end of the "A" resistors is shorted to ground by the other range lines which are not energized.

Only one of the relay driver circuits is illustrated within the dotted line box 684a. The other relay driver circuits for the first decade of digital potentiometer 668 are shown in boxes 684b, 684c and 684d, and all of the relay driver circuits in group 684a–684d are identical. While only a few connections to the one relay driver input line 680 in matrix 676 have been shown, it is understood that input line 680 may have many other connections to other range lines in the matrix, and likewise all of the other relay driver circuits controlling the digital potentiometer 668 will have input lines as at 690 to the matrix 676.

To set up the span adjustment for the gauge, another digital potentiometer 670 is used in the location shown in the modified bridge circuit 54b. This digital potentiometer is similar to digital potentiometer 668, but usually requires fewer decades. Digital potentiometer 670 is driven by a set of span potentiometer relays and drivers in group 692, and the relay driver circuits are identical with those in the box 684a. The relay driver switch amplifiers in group 692 are driven from input lines as at 694 from a span selector matrix section 696 similar to the center scale selector matrix 676.

For the purposes of calibrating the gauge or for other purposes, an arrangement is made to operate the relay drivers for the digital potentiometers 668 and 670 directly from a set of CENTER SCALE and SPAN thumbwheel switch units 700 and 702, also shown in FIG. 5. For each relay driver, there is one set of contacts as at 700a of the thumbwheel switches, connected directly to the relay driver coil as at 672 through an isolation diode 704. The thumbwheel switches 700 and 702 are similar to the thumbwheel switches, as at 144 and 146, FIG. 5, for setting the specification target and the composition. The switch dials have decimal numbers thereon, but their switch contacts are operated according to the basic binary code 8-4-2-1, as are the thumbwheel switches for setting up the memory elements as shown in FIG. 6. Diodes as at 705 connect the binary 8 contacts as at 8A to the relays in the binary 4 and binary 2 relay circuits in boxes 684b and 684c for the purpose of converting the basic binary code of the switch contacts to the 2'-4-2-1 code used by the digital potentiometer 668.

The thumbwheel switch contacts as at 700a are connected to a common line 706 which is placed at ground potential when it is desired to use the thumbwheel switches. Line 706 is grounded via a LOCAL-REMOTE switch 708 and a transistor switch 710 which is switched to connect a line 712 to ground when a signal appears on the $n_1$ scale output line. This signal also turns on the scale lamp 714 which lights a special deflection-from-zero scale index strip on the recorder of FIG. 5. This scale index has the number 0 (not shown) which corresponds with the chart index line in the center of the recorder chart 102.

The signal on the $n_1$ scale output line also turns off transistor switch 607, thus removing B+ power from range lines as at 604, 616 and 620. Therefore none of the relay drivers as at 674 will have a signal, and the relays 672 will be controlled exclusively by the switches as at 700, or by remote switches (not shown) when LOCAL-REMOTE switch 708 is in its remote (R) position.

The decimal numbers appearing on thumbwheel switch 700 indicate the arbitrary units which constitute the ordinates of the graph of FIG. 3, and the graphical calibration procedure is done in the usual manner. It is sometimes desired to select some weight per unit area value from the abscissa of FIG. 3 and to have this value of weight per unit area be indicated by the center zero position of the measuring pen and pointer 108 and 110. This of course requires that the number on the center scale thumbwheel switch 700 be set to the ordinate value which corresponds to the 0-center weight per unit area on the transmittance curve of the material being measured. The measurements then appear on the recorder as deflection-from-target measurements. This and other conventional uses for the settings available on the center scale and span thumbwheel switches 700 and 702 are conventional and need not be described.

While the invention has been illustrated and described herein as being embodied in a specific apparatus, with only a few modifications thereof specifically suggested, it is apparent that many changes, modifications or even outwardly quite different embodiments can be made without departing from the spirit and the scope of the invention as set forth in the appended claims.

For example, the binary memory elements have been shown and described as being capable of accepting only parallel, binary coded decimal inputs from the automatic supervisory control unit 48. However, it is apparent that these units may be easily rendered capable of accepting serial binary inputs by using conventional feedback or gating circuits between the memory elements, thereby converting the memory system into a broadside shift register of a well-known type which is capable of being set up by serial binary code pulses and clock pulses from a remote automatic device such as a digital computer.

Another example might be shown where the recorder of the several discussions is not in the feedback loop as described in the aforementioned Chope U.S. Pat. No. 2,790,945 but rather a repeat of that servo driven slidewire and recorder. In such a case the measure system need not be disabled in order to time share the servoamplifier since the measure system servoamplifier would not then be driving the repeat recorder. In this or other similar cases the sequence of presentation could be initiated at any time. Since the circuitry in the sequencer is highly flexible, even to the extent of providing for variable period between clock pulses as well as other outputs, other information such as temperature, speed, etc., could be presented upon demand.

Even though only one measure system has been discussed, the equipment is fully capable of setting up more than one system in a manner entirely similar to that already discussed. The setup need not even be limited to a weight per unit area measuring system. It can readily be extended to other measure or control systems, for example by utilizing a digital potentiometer to control the adjustment 96 as shown in FIG. 2. Another embodiment can be made by utilizing scale and composition selector signal outputs to directly drive by well-known means the switch 84 of FIG. 4 in order to select range of measurement. It is within the scope of this invention to utilize more than one of any or all of the several bits of apparatus described in a manner well known to those skilled in the art to accomplish digital setup of related equipment in addition to nucleonic and other radiation gauging apparatus per se.

What is claimed is:

1. In a system for determining a property of a traveling material, including a radiation gauge having calibration means and indicator means responsive to said gauge for indicating the value of said property, said indicator means including a measuring indicator, a target indicator and a plurality of scales, an improved digital setup apparatus comprising:
    means for receiving digital signals indicative of the desired value of said property, and in response to said digital signals selecting the proper scale from said plurality of scales, setting said gauge calibration means and causing said target indicator to indicate the location of said desired value on said proper scale.

2. In a system for determining a property of a traveling material including a radiation gauge having calibration means and indicator means responsive to said gauge for indicating the value of said property, said indicator means having a measuring indicator, a target indicator and a plurality of scales, an improved digital setup apparatus comprising:
    means for receiving digital signals indicative of the desired value of said property,
    means responsive to said digital signals for selecting the proper scale from said plurality of scales,
    first means responsive to said selecting means for setting said gauge calibration means, and
    second means responsive to said selecting means for causing said target indicator to indicate the location of said desired value on said proper scale.

3. In a radiation gauge for measuring a property of a traveling material, said gauge including calibration circuits and a recorder having a measuring indicator, a target indicator and a plurality of scales, an improved digital setup apparatus comprising:
    means for receiving digital signals indicative of the desired value of said property,
    logic circuit means responsive to said digital signals for selecting the proper scale from said plurality of scales,
    first means responsive to said logic circuit means for setting said gauge calibration circuits, and
    second means responsive to said logic circuit means for causing said target indicator to indicate the location of said desired value on said proper scale.

4. Apparatus as in claim 3 wherein said target indicator comprises a pointer, and wherein said second means responsive to said logic circuit means comprises a digital-signal-to-analog-position converter for servo positioning said pointer.

5. Apparatus as in claim 3 wherein said target indicator comprises a pointer, wherein said second means responsive to said logic circuit means comprises a digital-signal-to-analog-position converter for servo positioning said pointer, wherein said converter comprises a digital potentiometer responsive to said logic circuit means, and an analog servomechanism responsive to said digital potentiometer.

6. Apparatus as in claim 5 including means for coupling a voltage from said digital potentiometer to said analog servomechanism, and means external to said digital potentiometer and responsive to said logic circuit means for digitally adjusting the amplitude of said voltage.

7. Apparatus as in claim 5 including a feedback member in said servomechanism for providing an analog voltage, and means external to said feedback member and responsive to said logic circuit means for digitally adjusting the amplitude of said voltage.

8. Apparatus as in claim 5 including a strip chart and a chart moving mechanism for said recorder, a chart marking pen coupled to said pointer, a sequencing device, and means responsive to said logic circuit means and to said sequencing device for causing said converter to sequentially move said pen to a first position for indicating the scale used and to a second position for indicating said desired value.

9. Apparatus as in claim 8 wherein said means receiving said digital numbers includes means for receiving a further number indicating the composition of said material, and means causing said pen to move to a third position to indicate said composition on said chart.

10. Apparatus as in claim 8 including means receiving a signal indicative of a time interval wherein said gauge is not measuring, and means energizing said sequencing device in response to said last-mentioned signal for initiating said pen position moving sequence.

11. Apparatus as in claim 3 wherein said means for receiving said digital signals includes means for receiving further digital signals indicating the composition of said material, and wherein said logic circuit means includes means responsive to both said desired value and composition-indicative signals for setting said gauge calibration circuits.

12. Apparatus as in claim 3 wherein said means for setting said gauge calibration circuits comprises a pair of digital potentiometers in said gauge calibration circuits.

13. Apparatus as in claim 3 wherein said means for setting gauge calibration circuits comprises a plurality of analog potentiometers, and means responsive to said logic circuit means for selecting pairs of said analog potentiometers.

14. Apparatus as in claim 3 including means responsive to said logic circuit means for indicating numeral values for said proper scale.

15. Apparatus as in claim 14 wherein said means for indicating numeral values comprises an index scale member on said recorder, said index scale member bearing selectively lighted numerals.

16. Apparatus as in claim 3 wherein said means for receiving digital signals comprises a memory device for storing digital signals, and wherein said logic circuit means comprises means responsive to said stored digital signals.

17. Apparatus as in claim 16 wherein said gauge comprises an operator's control unit, selector means in said operator's control unit for selecting said desired value, a signal channel for digital signals between said desired value selecting means and said memory device, and a remote signal channel also connected to said memory device for feeding input signals thereto.

18. Apparatus as in claim 17 including means providing and maintaining a signal at said operator'a control unit when said input signals are received on said remote channel.

19. Apparatus as in claim 18 including switch means controlled from said operator's control unit for disabling said remote signal channel.

20. Apparatus as in claim 3 wherein said logic circuit means includes a plurality of circuit matrices each including a plurality of locations therein where circuit elements may be inserted to adapt the circuit logic to a desired calibration for said gauge and said target indicator.